United States Patent [19]
Houle

[11] Patent Number: 5,710,719
[45] Date of Patent: Jan. 20, 1998

[54] APPARATUS AND METHOD FOR 2-DIMENSIONAL DATA COMPRESSION

[75] Inventor: Paul Houle, Costa Mesa, Calif.

[73] Assignee: America Online, Inc., Dulles, Va.

[21] Appl. No.: 545,513

[22] Filed: Oct. 19, 1995

[51] Int. Cl.$^6$ .................................................. G06F 17/00
[52] U.S. Cl. ................................................... 364/514 R
[58] Field of Search .................. 364/514.12, 715.02; 382/244, 245; 348/418; 341/106

[56] References Cited

U.S. PATENT DOCUMENTS

| | | | |
|---|---|---|---|
| 3,656,178 | 4/1972 | De Maine et al. | 444/1 |
| 3,675,211 | 7/1972 | Raviv | 340/172.5 |
| 3,694,813 | 9/1972 | Loh et al. | 340/172.5 |
| 3,701,108 | 10/1972 | Loh et al. | 340/172.5 |
| 3,717,851 | 2/1973 | Cocke et al. | 340/172.5 |
| 4,021,782 | 5/1977 | Hoerning | 340/172.5 |
| 4,412,306 | 10/1983 | Moll | 364/900 |
| 4,464,650 | 8/1984 | Eastman et al. | 340/347 |
| 4,491,934 | 1/1985 | Heinz | 364/900 |
| 4,558,302 | 12/1985 | Welch | 340/347 |
| 4,612,532 | 9/1986 | Bacon et al. | 340/347 |
| 4,730,348 | 3/1988 | MacCrisken | 375/122 |
| 4,814,746 | 3/1989 | Miller et al. | 341/95 |
| 4,853,696 | 8/1989 | Mukherjee | 341/65 |
| 4,876,541 | 10/1989 | Storer | 341/51 |
| 4,906,991 | 3/1990 | Fiala et al. | 341/51 |
| 5,146,857 | 9/1992 | Chen et al. | 382/237 |
| 5,247,357 | 9/1993 | Israelsen | 358/133 |
| 5,267,334 | 11/1993 | Normille et al. | 382/56 |
| 5,466,918 | 11/1995 | Ray et al. | 235/380 |

OTHER PUBLICATIONS

Memon et al.; "Lossless Image Compression with a Codebook of Block Scans"; IEEE Journal On Selected Areas in Communications, vol. 13, No. 1, pp. 24–30, Jan.

Ziv and Lempel, *A Universal Algorithm for Sequential Data Compression*, IEEE Transaction Information Theory, 23(3):337, 1977.

*Primary Examiner*—Ellis B. Ramirez
*Attorney, Agent, or Firm*—Fish & Richardson P.C.

[57] ABSTRACT

A system and method for compressing data, including image data. The image data is formed by a pixel array, the pixel array having target pixels and prior pixels, each prior pixel being located in a position within the pixel array prior to each of the target pixels. The method of the present invention includes compressing the image data to obtain a compressed image. In the compression step, the pixel array is traversed according to a predetermined non-linear two-dimensional traversing pattern. A longest matching prior pixel string, if any, is located for each string of target pixels having a string of matching prior pixels. If no matching prior pixel is found for a target pixel, each such target pixel is characterized as an unmatched pixel. Finally, the compressed image is encoded and may be either transmitted or stored.

121 Claims, 4 Drawing Sheets

APPARATUS AND METHOD FOR 2-DIMENSIONAL DATA COMPRESSION

BACKGROUND OF THE INVENTION

1. Field of the Invention

This invention relates to data compression systems, and more particularly to an apparatus and method for compressing image data into a compressed form and for decompressing the compressed form.

2. Description of Related Art

In general, data compression refers to any process in which data in a given format is converted into an alternative format, in which the alternative format has fewer bits than the original format. Data compression systems are well known in the art and are used to encode an original stream of digital data signals into compressed digital data signals and to decode the compressed digital data signals back into the original data signals. Through the use of a data compression system, both the amount of data communicated between computer systems and the mount of required data storage space are reduced. Thus, data compression is advantageous because it provides a savings in the amount of time required to transmit a given body of digital information and in the amount of storage required to hold digital information.

Many data compression methods rely on the fact that digital data and data files typically contain a significant amount of redundancy. Such "redundancy compression methods" have been used to compress data files so that they will occupy less space on a storage device or so that they can be transmitted in less time over a communications channel.

Redundancy compression methods can be used to reduce "text files." A text file is a data file that contains a series of textual characters, such as letters of the alphabet, numbers, and/or punctuation marks. In a typical redundancy method for text files, an initial target character in the series of textual characters is located. In the simplest forms, the characters prior to the initial target character are then searched (or traversed) in a reverse direction, beginning at the character immediately preceding the initial target character, until a prior character is located that matches the target character. When an initial matching prior character is located, an attempt is made to extend the match beyond the target character to identify a matching "character string" of prior characters. To this end, the search moves "forward" to a new target character immediately following the initial target character and also moves "forward" to a next prior character immediately following the initial matching prior character, and the system determines whether the succeeding target and prior characters match. If so, the process continues along the string of succeeding prior characters until a matching fails. The matching character string is then defined from the initial matching prior character to the last matching prior character.

To compress the data, the matching character string may be represented by two data items: (1) the beginning point of the string of matching prior characters (i.e., the location within the series of characters of the initial matching prior character); and (2) the length of the string of matching prior characters. In this way, the string of target characters that matches the prior characters is represented simply as data indicating (1) the initial position of the matching data string and (2) the length of the string. As a result, a string of target characters having a matching prior character string is represented by fewer bits than if each target character were independently encoded.

In many redundancy compression methods, a "longest matching data string" is sought. In such methods, the process does not stop when a first matching data string is located. Instead, the search continues in a reverse direction back through the prior characters, beginning with the prior character immediately preceding the initial matching prior character. The process continues until a longest matching data string is located (which may be the initial matching data string). By locating the longest matching data string, rather than merely stopping at the first matching data string, further compression of the data text may be accomplished.

In the following example, redundancy compression is illustrated. Suppose the following character string is being transmitted: "THE RAIN IN SPAIN FALLS MAINLY ON THE PLANE." This data is encoded as follows. The first character, "T," is encoded as a "literal" code, meaning that it is uncompressed (and indeed may be slightly expanded by a flag bit indicating that it is a literal code). The second character, "H," then becomes the target character, and the previously encoded characters are searched in an attempt to find a match. In this case, the only preceding character that has been encoded is the initial "T," which does not match the next character, "H." Accordingly, the "H" character is encoded as a literal code. Each succeeding character after "H" then becomes the target character, and the previously encoded characters are searched for a match. Discounting, for this example, the blank space between "RAIN" and "IN," the first character match occurs at the "I" in the first occurrence of the word "IN," which matches the "I" in the word "RAIN." The search for a matching string then begins, and the new target character becomes the "N" in "IN." The character immediately following the matching "I" in the word "RAIN" is thus compared to the new target character to determine if a match exists. As can be seen, a match does exist, because the new target character and the character immediately following the preceding matching character are both an "N." The process continues until a match does not occur. In this case, that occurs at the first letter in the word "SPAIN" (i.e., "S"). Thus, the matching data string located by this redundancy technique is "IN" (with the blank space following the "N" also having a matching previous blank space). The matching data string, i.e., "IN", is then compressed by encoding it as the initial location of the initial character in the matching data string (i.e., the "I" in "RAIN") and the length of the matching data string (in this case, three characters "I", "N", and "blank space"). This process is continued throughout the text file until the entire file is compressed and encoded. As described above, the process could continue after a first matching string is located in an effort to locate a longest matching string.

Conventional redundancy compression has employed either a "linear traverse method" or a "hashing method" to search the prior textual characters. Both of these methods, however, have disadvantages and drawbacks, especially where the data being compressed is image data, rather than textual data. Before describing these drawbacks, however, it is important to understand some of the aspects of image data. Image data includes a two-dimensional array of pixels. Each pixel may be considered to be the equivalent of a character in a text file. Each pixel represents a point in the image and includes data representing, for example, the color and intensity of the pixel. Because images may have entire areas that are uniform or quite similar in appearance (for example, a blue ocean constituting a large area of the image), pixel data may be extensively replicated in a patterned manner within the image. Thus, redundant pixels may be more likely to occur in certain positions relative to a target pixel than in other positions relative to that pixel.

If the linear traversing method is employed for compressing images, the search for a prior pixel that matches the target pixel is performed by traversing "backward," one pixel at a time and in order, through the prior pixels. Thus, in the linear traversing method, no attempt is made to compensate for the fact that a matching pixel may be more likely to be located in a certain position relative to the target pixel. Rather, the pixels are simply traversed linearly backward through the prior pixels until a match, if any, is located. Accordingly, using the linear traversing method to compress image data is inefficient and fails to achieve high-speed image data compression. Because it is extremely important in data compression systems to maximize the speed at which image data is compressed (or decompressed), the relatively slow speed of the linear traversing method degrades system performance, making the method disadvantageous for compressing and decompressing image data.

In the conventional hashing methods, a "history array," "history array pointer," "hash table," and "offset array" are used to search back through prior pixels to locate matching pixel strings. The history array contains a number of entries, each entry for storing a portion of the input data stream of prior pixels. The history array pointer points to the latest entry in the hash array. The hash table contains a series of entries that contain history array pointers. The offset array (or hash link table) points to the previous entry in the history array that corresponds to a particular hash value, and another item in the offset array points to the oldest entry in the history array associated with this hash value. The history array pointer, hash table, and offset array constitute a "hash data structure."

In hashing, as the data stream of pixels are being scanned or input into the system, the history array pointer, hash table, and offset array are used to find specified strings stored in the history array, which is searched for a longest matching pixel string that matches a string of pixels in the input data stream. When attempting to find the longest matching string, a hashing function must be performed, which includes several steps. First, the results of a hashing function must be obtained, which function provides a pointer to one of the entries in the hash table. Second, the pointer stored in the hash table that is pointed to by the result of the hash function is obtained. Third, a calculation is performed to obtain the difference between the history array pointer and the pointer obtained from the hash table, the difference being stored in the offset array entry pointed to by the history array pointer. Last, the history array pointer is stored in the hash table entry pointed to by the hash functions.

Further, to maintain the hash data structures, computations must be performed to update the various pointers and entries. Such computations slow the compression rate and tie up valuable CPU time during which the CPU could be performing other functions.

Accordingly, systems that employ the hashing method for data compression are complex and resource intensive. Thus, systems employing the hashing method for compressing image data are difficult and expensive to implement and are slowed by their computation requirements for carrying out the hashing method.

Therefore, a need exists for a method and apparatus for compressing and decompressing image data that obviates the disadvantages and drawbacks resident in conventional methods for compressing image data. The present invention provides such a method and apparatus.

SUMMARY OF THE INVENTION

The present invention is a method and apparatus for compressing a stream of data and for decompressing previously compressed data. The data may represent an image that is either two-dimensional or three-dimensional. It should be recognized, however, that the present invention could be used to compress any type of data, including character data.

The present invention takes advantage of the observation that image data may have redundancy in two dimensions, with large areas of the same or similar color. The present invention uses this fact to traverse image pixels in a predetermined pattern designed to minimize the number of prior pixels that must be traversed to find the longest matching string of prior pixels.

In accordance with the present invention, an incoming stream includes a plurality of incoming data pixels, of which two or more constitute an incoming data string. The method includes several steps. The incoming data stream is initially read to obtain prior data, which includes prior data strings. The prior data is then searched in a predetermined non-linear traversing pattern for longest matching prior data strings that match incoming target data strings. If any longest matching data strings are found, they are compressed and encoded into copy tokens. Any incoming target data pixels that have no matching prior pixel are encoded as literal tokens. The copy and literal tokens are then entropy coded and output to storage or for transmission.

More particularly, in the present invention, a target pixel is compared to prior pixels in a pixel array to determine whether any of the prior pixels matches the target pixel. In the preferred embodiment, the prior pixels are searched in an empirically predetermined non-linear two-dimensional traversing pattern that traverses the prior pixels in a manner designed to minimize the time it takes to locate matching prior pixels and thereby optimize the compression rate. The non-linear traversing pattern may be held constant throughout the process of compressing an entire image, or may vary to accommodate "boundary" conditions (e.g., edges of an image) or in response to "learned" or heuristically determined characteristics of a particular image.

Using the non-linear traversing pattern, if a prior pixel is located that matches the target pixel, the location of the matching prior pixel within the non-linear traversing pattern, relative to the target pixel, becomes the starting point (or "non-linear pixel offset") of a matching data string. (The term "non-linear pixel offset," in this context, refers to the number of pixels, in the non-linear traversing pattern, lying between the initial target pixel and the initial matching prior pixel.) A next target pixel, which immediately follows the initial target pixel, is then selected, and the prior pixel immediately following the first matching prior pixel is compared to the next target pixel to determine if those two following pixels match one another. If so, the process continues until a next prior pixel does not match a corresponding next target pixel. The number of matching prior pixels constitutes a string length for the matching data string, and the location of the initial matching prior pixel in the non-linear traversing pattern becomes the non-linear pixel offset for the matching data string. (The "linear pixel offset" of the initial matching pixel can be generated from the non-linear pixel offset and from the position of the target pixel within the array of pixels. The term "linear pixel offset" means the number of pixels, in linear order within the array of pixels, lying between the target pixel and the initial matching pixel.)

Once a first matching string is located, the process continues, using the predetermined non-linear traversing pattern to locate additional matching prior pixel strings, if any. Any longer match replaces an earlier, shorter match. Preferably, the method includes a reasonable limit on the number of prior pixels searched via the traversing pattern. Thus, the process of searching for matching prior pixel strings may stop before reaching the beginning of all prior pixels. The longest matching string is then encoded as a "copy token," which includes data indicating the non-linear pixel offset of the longest matching string and its string length. If no matching prior pixel is located for a target pixel during the process of traversing the prior pixels in the non-linear traversing pattern, the unmatched target pixel is encoded as a "literal token." The process of searching for matching strings continues to the end of the pixels comprising the image, thereby locating all copy tokens and all literal tokens to form a token set.

The token set is then further globally encoded (preferably using a Huffman data compression algorithm) to obtain a stream of encoded compressed image data. This stream of encoded compressed image data is then transmitted or stored. If transmitted, when the stream of encoded compressed image data is received, it is decoded using a decoding algorithm to obtain a decoded stream of compressed image data. If stored, when the stream of encoded image data is retrieved, it is decoded using a decoding algorithm (e.g., Huffman decoding), also thereby obtaining a decoded stream of compressed image data. In both cases, the token set of the decoded stream of compressed image data is then expanded to obtain a decompressed image identical to the original image.

In one embodiment, pixels are considered to be "matching" only if the pixels being compared contain identical data. In this embodiment, if a target pixel does not identically match any of the prior pixels traversed by the non-linear traversing pattern, the target pixel will be encoded as a literal token, and the process will continue throughout the array of pixels in an attempt to find strings of identically matching pixels.

In an alternative embodiment, a target pixel and prior pixel are considered to be a "match" even if they are not identical, provided the prior pixel falls within a preset tolerance of the target pixel. In this embodiment, the prior pixel is compared to the target pixel, and if the prior pixel falls within the preset tolerance of the target pixel, the prior pixel is considered a "match." Thus, similar but non-identical colors can be deemed to "match." After the search for a matching data string begins, target pixels following an initial target pixel are compared to corresponding prior pixels following the initial matching prior pixel, and in each case the preset tolerance is applied to the target pixels. This embodiment permits higher compression ratios, but results in "lossy" compression.

By employing the predetermined non-linear traversing pattern, the present invention overcomes disadvantages and drawbacks of prior art compression methods. First, the nonlinear traversing pattern has been empirically determined so that it locates longest matching data strings much more quickly and with less pixel traversing than is required with the linear traversing method of the prior art. Accordingly, compression speed is substantially increased. Second, the present invention eliminates the need for complex circuitry and time-consuming computations required in the hashing method. Thus, the present invention is less costly, less complex, and faster than hashing.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Moreover, throughout the remainder of this description, for convenience, reference will be made to image data and pixels. It should be recognized, however, that the present invention is not limited to compression and decompression of image data. Rather, the present invention can be applied to any system or data-type in which data compression is employed.

Overview of Operating Environment

The following describes a procedure, preferably implemented as a computer program stored on a storage media or device (e.g., ROM or magnetic diskette) readable by a general purpose computer or programmable processing system, for configuring and operating the computer or processing system when the storage media or device is read by the computer or processing system, the computer or processing system being operated to perform the functions described below.

Figure 1:
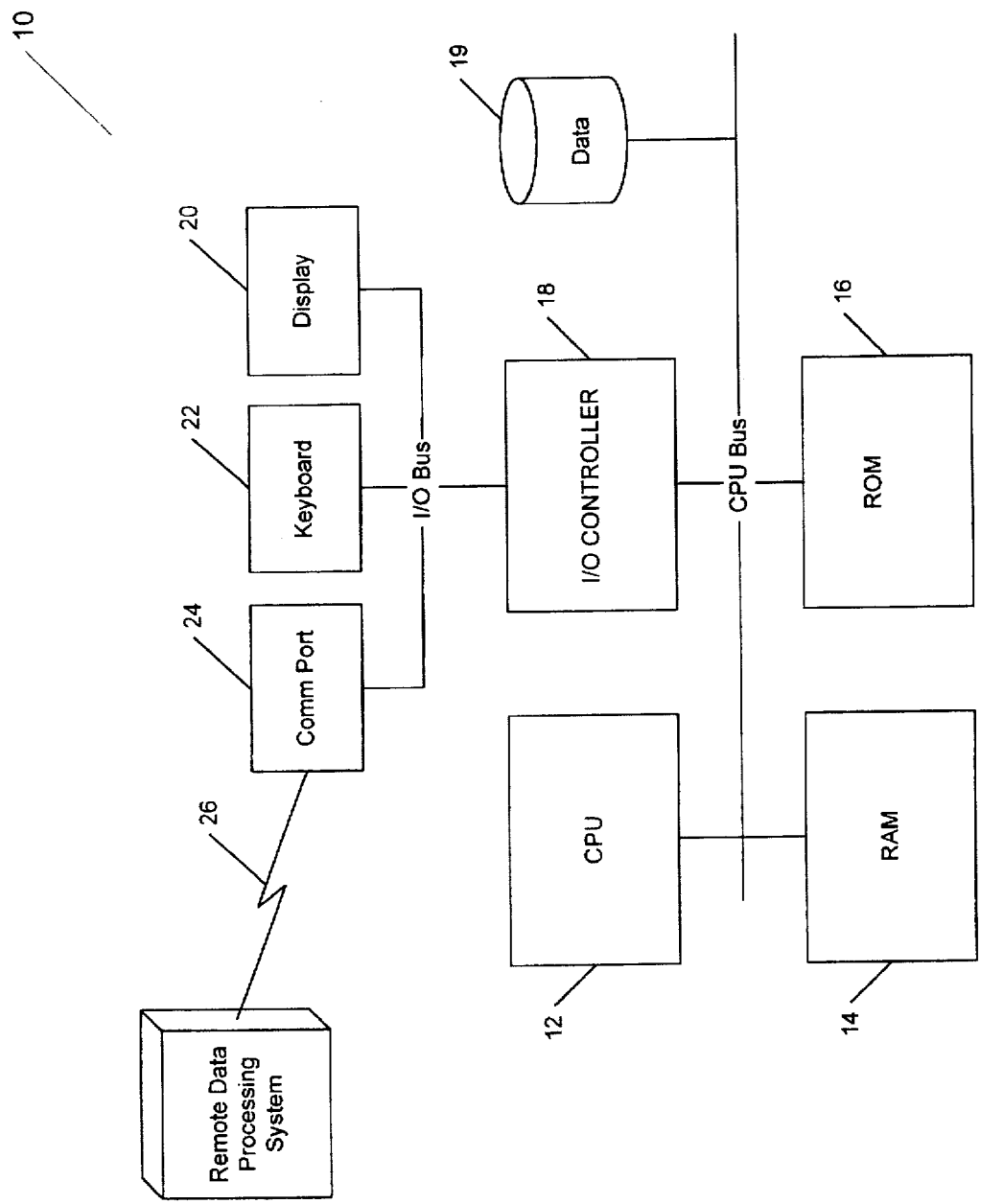
FIG. 1 is block diagram of a programmable computer system for implementing the compression and decompression method of the present invention.

FIG. 1 shows a block diagram of a typical programmable processing system 10 which may be used for implementing the compression and decompression system of the present invention. The processing system 10 preferably includes a CPU 12, RAM 14, ROM 16 (which may be writable, such as a flash ROM), an I/O controller 18, and an optional storage device 19, such as a magnetic disk, coupled by a CPU bus as shown. Coupled to the I/O bus are input and/or output devices, such as a display 20, a keyboard 22, and a communication port 24, as well as the I/O controller 18. The display 20 may be used to display an original image to be compressed. The programmable processing system 10 may be pre-programmed, or may be programmed (and reprogrammed) by downloading a program from another source (e.g., another computer). The CPU 12 must have a comparator circuit or be programmable to compare one data value to another data value to determine identity or difference between the data values, and optionally to compare the difference between two data values to a third value (e.g., a threshold value).

The programmable processing system 10 may be coupled via a communication link 26 to a remote processing system 30. Data may be communicated over the communication link 26 between the programmable processing system 10 and the second programmable processing system 30. Using the system shown in FIG. 1, an original image may be compressed and encoded to obtain a compressed image. The compressed image may then be transmitted over the communication link 26 and, upon receipt, may be decoded and decompressed to obtain the original image. Alternatively, the original image may be compressed and encoded and stored in, for example, the storage device 19 to obtain a stored compressed image. The stored compressed image may later be retrieved by the CPU 12 and decoded and decompressed to obtain the original image, which can again be displayed on the display 20. The CPU 12 may house the hardware and software used to compress, encode, decode, and decompress the original image1, or such hardware and software may be resident in a remote computer or in a separate module of the programmable processing system 10.

Overview of Basic Method

Figure 2:
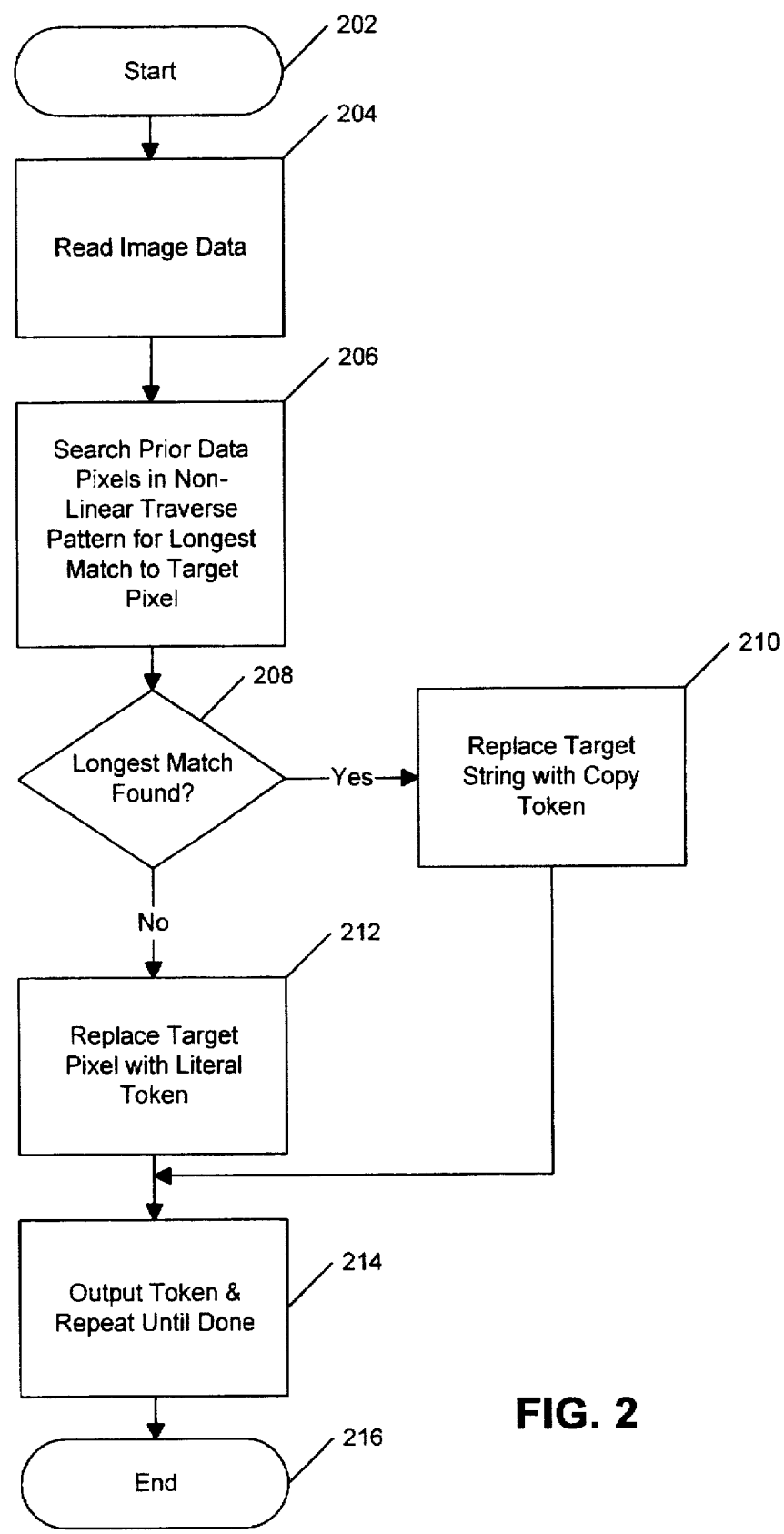
FIG. 2 is a flow diagram showing the basic method of the preferred embodiment of the present invention.

FIG. 2 is a flow diagram of the basic method of the present invention. The method shown in FIG. 2 is used for compressing an incoming data stream, which includes a plurality of incoming data pixels, of which a group of two or more comprise an incoming data stream. (As used herein, "pixel" means any data segment, data structure, or set of bits that define a picture element of an image regardless of color depth or colorspace model used, and includes character data.) The method begins at a Start state 202. An incoming data stream (e.g., a data file or transmitted image) is read into a computer memory to obtain initial image data (Step 204). The data stream may represent an entire image or blocks defining a portion of an image if memory resources are exceeded. In this latter case, the blocks may be treated as "subimages" and separately compressed in accordance with the present invention. However, the present invention normally would be applied to compress a "moving window" of data representing portions of an image, such that the entire image is processed.

Generally, an image being compressed is represented as a data file that describes an image in terms of a rectangular array of pixels, regardless of the shape of the original image (e.g., rectangular, circular, etc.). Nevertheless, images having other array configurations, such as hexagonal, may also be compressed using the procedure described below. No matter the image represented by a pixel array, however, the array has a beginning and an end, with a first "prior" pixel being located at the beginning of the pixel array and thus being the first pixel in the array. For the remainder of this description, when reference is made to moving or traversing "forward" through the pixel array, it is meant that the movement or traverse is in a direction from the beginning to the end of the pixel array (i.e., away from the first prior pixel). Reference to moving or traversing "backward" through the pixel array means that the movement or traverse is in a direction from the end to the beginning of the pixel array (i.e., toward the first prior pixel).

Referring again to FIG. 2, as each new, or "target", pixel is read, the prior pixel data is searched in a predetermined non-linear (two-dimensional) traversing pattern, searching for a longest matching string in the prior data (Step 206). Accordingly, each longest matching prior data string comprises a prior data string that matches a data string from the incoming data stream.

Preferably, the predetermined non-linear traversing pattern has a fixed length for a single image. That is, for each target pixel, the predetermined non-linear traversing pattern has a fixed number of prior pixels that it traverses, and, for each image, the traversing pattern ceases at a predetermined number of prior pixels that are searched.

Alternatively, an advantage may be gained by varying the length of the traversing pattern within a single image. Thus, the length of the traverse pattern may be dynamically altered within a single image. Optionally, a fully variable (i.e., optimal) pattern may be calculated for a single image. That is, the traversing pattern may vary from image to image.

The extent and path of the non-linear traversing pattern may be limited by the configuration of the data to be compressed. For example, an image to be compressed is made up of an array of pixels having borders or limits, and the traversing pattern may include segments that fall outside the limits of the pixel array. In such cases, the segments that fall outside the limits of the pixel array may be dynamically removed, for example, at the edges of the array. The removed segments are not represented in the vector comprising the longest matching data string; i.e., the removed segments are treated as if they never existed in the traversing pattern. This speeds processing, since such segment(s) are not useful in locating longest matching pixel strings.

As noted above, the predetermined non-linear traversing pattern may be determined empirically. To empirically determine an optimal traversing pattern, a large number of test images are exhaustively scanned (in a linear fashion, as described in the background section) for prior pixels that match target pixels. A histogram is then calculated, revealing the frequency of matches in prior pixel locations. This histogram is then sorted in a descending order, and the relative pixel offsets corresponding to the sorted frequencies of matches become the preferred non-linear traversing pattern.

As embodied herein, a preferred traversing pattern has been determined by the above method. A pixel offset is defined as the location in a two-dimensional array, relative to a target pixel, of a prior pixel being searched for a match with the target pixel. In the preferred empirically determined traversing pattern, the first 24 relative pixel offsets are scanned (by default) in the following order:

| 23 | 18 | 16 | 7 | 17 | 19 | 24 |
|----|----|----|---|----|----|----|
| 21 | 14 | 6  | 3 | 9  | 15 | 22 |
| 11 | 8  | 4  | 1 | 5  | 10 | 20 |
| 12 | 13 | 2  | # |    |    |    |

In the above diagram, the "#" symbol represents the target pixel, or the position being encoded for which a matching prior pixel is being searched. The numbers 1-24 represent the first 24 relative pixel offsets, in order, in the traversing pattern.

In the above diagram, offsets 1-5 may be given slightly preferential treatment when encoding the pixels as tokens. (The token scheme is described in detail below.) In the preferred embodiment, offsets 1-5 are assigned unique tokens without appending additional token flag bits, which are appended to non-preferential tokens. Because of this, after an image is encoded as tokens, the five most frequently occurring of the above 24 relative offsets are identified, and all of the first 24 offsets are permuted just enough so that the five most frequently occurring offsets are assigned the optimal 1-5 token positions. This permutation is reversed during the decoding process and has no affect on other parts of the encoding/decoding process, which will be described in detail below. The purpose of giving slightly preferential treatment to the most frequently occurring offsets is to increase bit-packing efficiency. The five offsets of the highest frequency from the first 24 offsets are called the "most popular" offsets.

In the preferred embodiment, after scanning the first 24 relative offsets, the next 41 offsets are scanned in the following order:

|    |    |    |    |    |    |    |    |    |    |    |    |
|----|----|----|----|----|----|----|----|----|----|----|----|
|    |    | 46 | 47 | 48 | 49 | 50 | 51 | 52 | 53 | 54 | 55 | 56 |
| 65 | 45 | 29 | 30 | 31 | 32 | 33 | 34 | 35 | 36 | 37 | 57 |
| 64 | 44 | 28 | .. | .. | .. | .. | .. | .. | .. | 38 | 58 |
| 63 | 43 | 27 | .. | .. | .. | .. | .. | .. | .. | 39 | 59 |
| 62 | 42 | 26 | .. | .. | .. | .. | .. | .. | .. | 40 | 60 |
| 61 | 41 | 25 | .. | .. | .. | #  |    |    |    |    |    |

As with the first diagram shown above, the "#" symbol represents the target pixel for which a matching prior pixel is sought.

In the preferred embodiment, the number of locations in the non-linear traversing pattern is limited to some reasonable number to balance depth of searching (which might result in longer matches) with speed of compression.

For images having a small column width (edge to edge), some of the above offsets may produce redundancies by "wrapping around" from the first to the last column, or from the last to the first column. As embodied herein, such wrapping around is allowed. Wrapping around simplifies implementation of the compression scheme. It also results in a compression increase, because colors occurring at the border of an image are often related.

The remaining relative offsets are scanned in a linear pattern backward from the target pixel position, disregarding any offsets already considered from a prior scanning stage. For example (assuming a 16-column image), the scanning continues as follows:

|    |    |    |    | 99 | 98 | 97 | 95 | 95 | 94 | 93 | 92 | 91 | 90 | 89 |
|----|----|----|----|----|----|----|----|----|----|----|----|----|----|----|
| 88 | 87 | 86 | .. | .. | .. | .. | .. | .. | .. | .. | .. | .. | 85 | 84 |
| 83 | 82 | .. | .. | .. | .. | .. | .. | .. | .. | .. | .. | .. | 81 | 80 |
| 79 | 78 | .. | .. | .. | .. | .. | .. | .. | .. | .. | .. | .. | 77 | 76 |
| 75 | 74 | .. | .. | .. | .. | .. | .. | .. | .. | .. | .. | .. | 73 | 72 |
| 71 | 70 | .. | .. | .. | .. | .. | .. | .. | .. | .. | .. | .. | 69 | 68 |
| 67 | 66 | .. | .. | .. | .. | #  |    |    |    |    |    |    |    |    |

Referring again to FIG. 2, and specifically Step 208, if a longest matching prior data string is found, the corresponding matching target data string is compressed by encoding it (i.e., replacing it) with a "copy token" (Step 210). If no longest matching prior data string is found, each unmatched pixel from the incoming data stream is encoded as a "literal token" (Step 212). Preferably, the encoding process is performed as the longest matching prior data strings and unmatched pixels are encountered. Thus, encoding may occur in a step-wise manner; that is, the method may be implemented such that it does not require that all located longest matching prior data strings and unmatched pixels be encoded after the entire image has been scanned. Optionally, however, the encoding step may occur after the entire image has been scanned and all unmatched pixels and longest matching prior pixel strings have been located.

After encoding, the copy tokens and literal tokens are output and the process repeated (Step 214) until all pixels have been encoded, at which point the basic process ends (Step 216). The copy tokens and literal tokens may then be transmitted over a communication link (as illustrated in FIG. 1) to another data processing system 30. Because the incoming data stream (or image) has been compressed using the method of FIG. 2, fewer bits need be transmitted over the communication link 26 to the data processing system 30. Alternatively, the compressed data can be stored in the storage device 19, requiring less storage space than would otherwise be required if the data or image were not compressed.

Searching Algorithm

Figure 3:
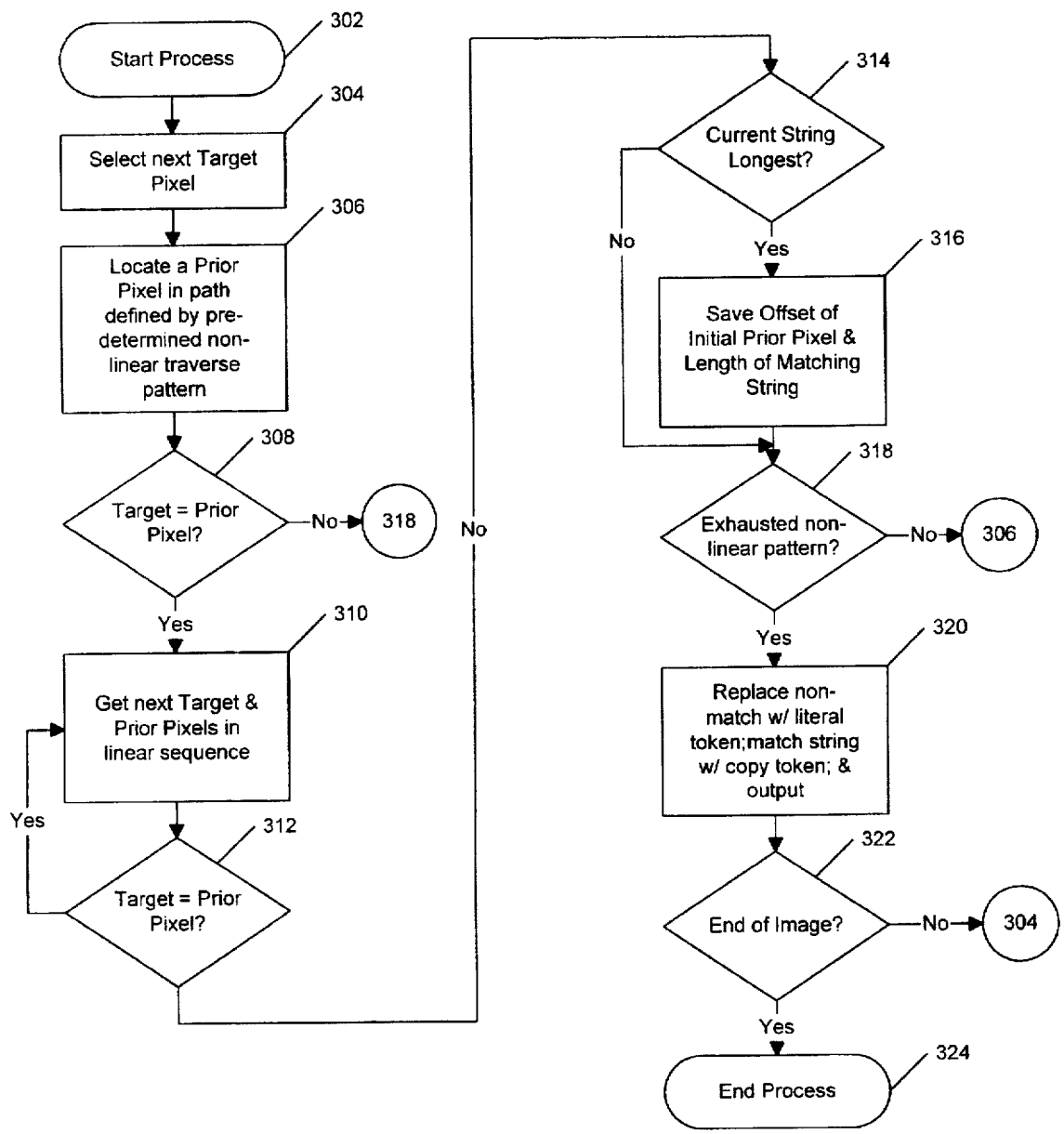
FIG. 3 is a flow diagram showing in detail the process for locating and tokenizing longest matching data strings and unmatched target pixels in accordance with the present invention.
Figure 4:
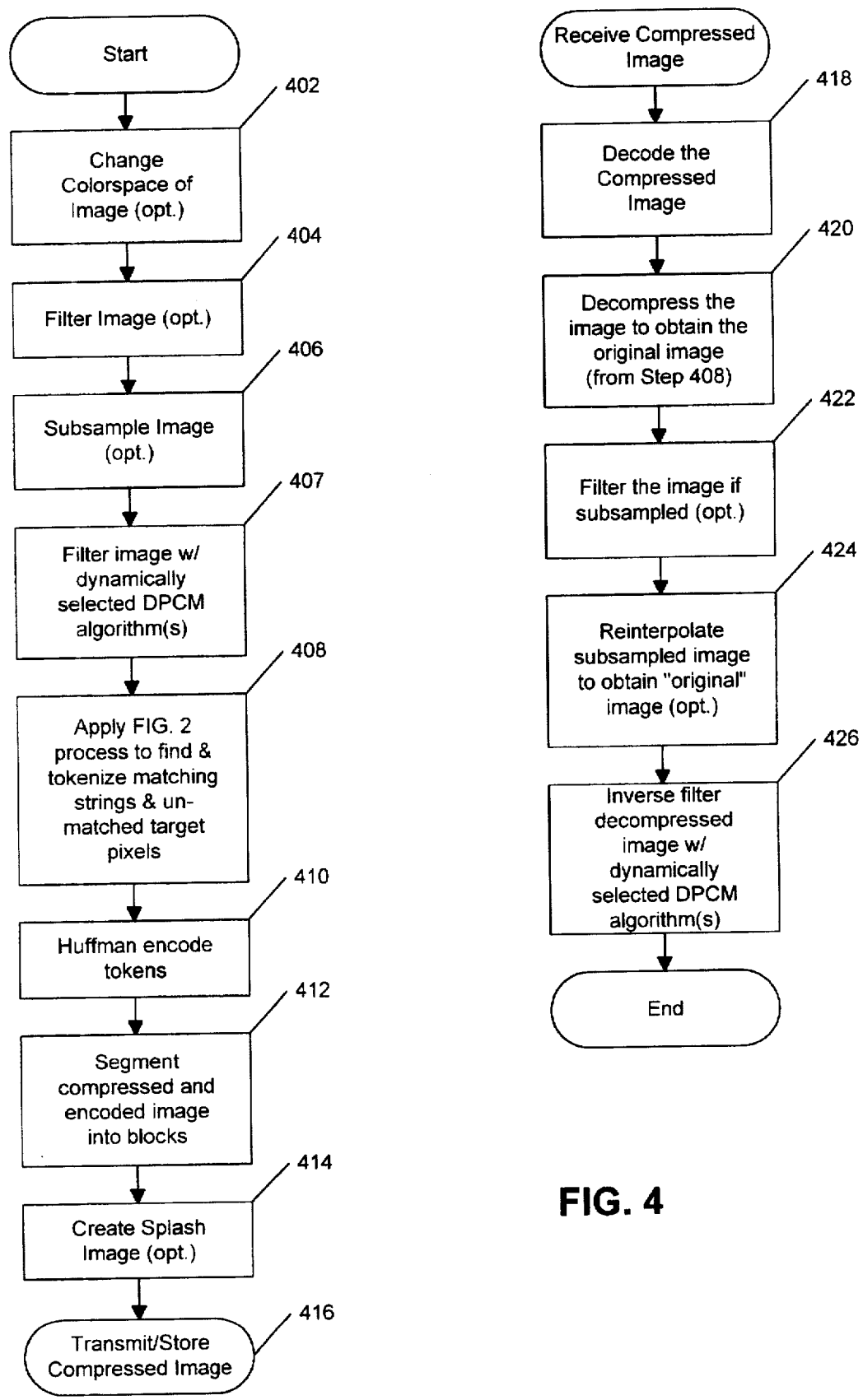
FIG. 4 is a flow diagram showing a more detailed version of the entire compression/decompression process of the preferred embodiment of the present invention.

FIG. 3 illustrates Steps 204–214 of FIG. 2 in greater detail to show the preferred method of compressing an image. The first step in FIG. 4 is to select a "next" target pixel to be processed (Step 302). (This "next" target pixel may be the first pixel processed.) Once the target pixel is selected, prior pixels (i.e., those pixels located at prior positions within the pixel array relative to the initial target pixel) are traversed in the predetermined non-linear traversing pattern (Step 304).

During the process of traversing prior pixels, the target pixel is compared to each prior pixel encountered in the traversing pattern to determine whether any such prior pixel matches the target pixel (Step 306). If no match is found (Step 308), a test is made to see if the non-linear traversing pattern has been exhausted (Step 3 18). If not, processing continues at Step 306.

If a match is found (Step 308), thereby locating an initial matching prior pixel, an attempt is made to extend the match. Accordingly, target pixels following the initial target pixel and prior pixels following the initial matching prior pixel are traversed in a forward linear pattern to try to extend the initial match (Step 310). Thus, the linear traversing pattern moves toward the end of the pixel array (i.e., away from the first prior pixel).

More particularly, once an initial matching prior pixel is located, each target pixel following the initial target pixel has a corresponding next prior pixel. Thus, to determine whether a string of target pixels matches a string of corresponding prior pixels, one by one, each target pixel following the initial target pixel is compared to its corresponding prior pixel (Step 312). If it is found that the corresponding target and prior pixels being compared match one another, Step 310 is repeated to determine whether the next corresponding target and prior pixels match one another. This process continues until a match is not found (Step 312), indicating the termination point of the current matching string of prior pixels.

Once the end of a matching prior pixel string is reached, the length of the current matching string is compared to any prior saved string length for the initial target pixel currently being processed (Step 314). If the current string is the first to be found, or the current string is longer than the previously saved string, the relative offset and string length of the current matching string represent a "current" longest match and are stored (Step 316). (Preferably, as defined in the summary section, the non-linear pixel offset is stored, from which, together with the position of the target pixel, the linear pixel offset can be generated. It should be recognized, however, that the linear pixel offset alternatively could be stored.) Otherwise, the current match is discarded, and processing continues at Step 318. Alternatively, the offset and length information is immediately replaced with a copy token (see below).

To optimize compression, it is highly desirable to locate and encode not just a string of matching data, but the longest string of matching data (within some limited search space). By searching for and locating the longest matching string, greater compression can be attained than if only a first matching data string is located and the process were to cease at that point. Thus, the next step is to determine whether any previous matching prior pixel strings exist and are longer than the current longest match. Accordingly, if the non-linear traverse pattern is not exhausted (Step 318), processing repeats at Step 306 until the image pattern is exhausted. As explained above, preferably the non-linear traverse has a predetermined termination point, so that each and every prior pixel is not traversed. If all prior pixels were traversed (i.e., the non-linear traverse ended only when the first prior pixel was reached), the increase in compression speed attained by the present invention would be reduced. Therefore, in formulating the non-linear traverse pattern of the present invention, a determination is made as to how many prior pixels should be traversed to optimize not only compression speed, but also the amount of bit reduction. This is done by correlating the length of the non-linear traversing pattern with the likelihood of locating a longer matching string by traversing farther backward through the prior pixels. The point at which compression is optimized, as explained above, may be empirically determined.

The continuation of the traversing pattern begins with the prior pixel immediately preceding, in accordance with the traverse pattern, the initial matching prior pixel of the most recent matching string. Thus, because the non-linear traverse is continued, the next prior pixel traversed may not necessarily be the prior pixel immediately preceding, in the pixel array, such initial matching prior pixel. Rather, because the traverse pattern is non-linear, the next prior pixel to be compared to the initial target pixel may be located at a position within the pixel array that is far removed from the initial matching prior pixel. (For the preferred non-linear traversing pattern, see the above diagrams illustrating the empirically determined "pixel offsets" comprising the traversing pattern.) The process then continues in an attempt to locate another matching string of prior pixels and to determine whether such string is the longest matching string.

If the non-linear traverse pattern is exhausted (Step 318), either no match will have been found for the initial target pixel, or a longest string will have been found. In the former case, the target pixel is replaced with a literal token; in the latter case, the matching target string will be replaced with a copy token (Step 320). The token is then output.

A test is then made to see if the image has been completely processed (Step 322). If so, processing ends (Step 324). If not, a next target pixel is selected for processing (Step 304). The next initial target pixel is located at a position immediately following the last target pixel for which a matching prior pixel was sought. If, during the process of traversing the prior pixels in the non-linear traverse pattern, no prior pixel was located that matched the initial target pixel, then the next initial target pixel is the target pixel immediately following the previous initial target pixel for which no match was found. If, however, a matching string of prior pixels was located, the next initial target pixel is the target pixel immediately following the last target pixel in the string of matched target pixels. The process then goes to Step 306, and the prior pixels, relative to the current target pixel (i.e., a "moving window"), are again traversed in the predetermined non-linear traversing pattern, this time searching for an initial matching prior pixel that matches the next initial target pixel.

Definition of a "Match"

The method of the present invention can provide for lossy as well as lossless compression. For lossless compression, two pixels are considered "matching" only if they are identical. In lossy compression, two pixels are considered "matching" even if they are not identical, provided they fall within a preset tolerance (which may be pre-programmed, or user-definable to allow for variable degrees of compression). Thus, the degree of comparison between a target pixel and prior pixel may vary by the preset tolerance. If a target pixel is within the tolerance of a prior pixels, the target and prior pixels are deemed a match, and the process of matching target and prior pixels to locate matching prior pixel strings continues, until the longest string within the tolerance is found in the prior pixels.

Several variations or features can be employed to increase the accuracy or effectiveness of tolerance (or lossy) matching. First, a variable tolerance can be used to control the degree of loss. This tolerance can be variable from image-to-image or within a single image. Second, the method can be modified, such that, when searching for matches within the tolerance and an out-of-tolerance miss occurs, the matching process can continue for the string being searched to determine if additional subsequent pixels in the string are within the tolerance. If so, the "out-of-tolerance" miss can be considered a "match" anyway. Third, a variation of this scheme is to have a second order tolerance indicating the average quality of hits in a string comparison. Fourth, the total error over a matching string can be monitored, stopping the matching process if the "error" exceeds a certain threshold value ("error" referring to the difference between the prior and target pixels). This can be used to minimize "streaking," which can result from a small error (that is still within the tolerance) repeated over a large count of pixels, for example, in a background color.

If tolerance comparisons are employed in locating matching prior pixel strings, the prior pixels being scanned (or searched) are the reconstructed versions, not the original source image pixels. This is because the scanning process must take place against the same pixels that are provided to a decoder when it reconstructs the image being compressed; otherwise, the tolerance comparisons would be inaccurate. Moreover, if tolerance comparison is employed, a step can be added to produce the reconstructed pixel versions, in which matched target pixels are replaced with their matching prior pixels (from the already reconstructed image). The matching prior pixels may differ from the target pixels they are replacing, because the matching process potentially produces non-identical matches.

Tokenizing

For unmatched target pixels, the original pixel value of the target pixel is tokenized as a literal token and output. The decoder or decoding step (described below) responds to such literal tokens by inserting this single pixel value into the reconstructed image. The literal pixel may not exactly match its original, however, if it is convenient to modify the pixel later (within tolerance) to improve (e.g., lengthen or reduce total error of) a subsequent match.

More particularly, the following table describes the token set into which the literal and copy elements are mapped in the preferred embodiment (where "ML" represents the "Minimum Length" copy string, which varies from image to image and can be set to any value between 2 and 17):

| Range | Meaning | Extra Bits | Offset(s) | |
|---|---|---|---|---|
| 0–255 | Literal pixels | n/a | n/a | |
| 256–260 | ML copy | 0 | 1–5 | |
| 261 | ML copy | 2 | 6–9 | (6+Extra Bits) |

-continued

| Range | Meaning | Extra Bits | Offset(s) | |
|---|---|---|---|---|
| 262 | ML copy | 3 | 10–17 | (10+Extra Bits) |
| 263 | ML copy | 4 | 18–33 | " |
| 264 | ML copy | 5 | 34–65 | " |
| 265 | ML copy | 6 | 66–129 | " |
| 266 | ML copy | 7 | 130–257 | " |
| 267 | ML copy | 8 | 258–513 | " |
| 268 | ML copy | 9 | 514–1025 | " |
| 269 | ML copy | 10 | 1026–2049 | " |
| 270 | ML copy | 11 | 2050–4097 | " |
| 271 | ML copy | 12 | 4098–8193 | " |
| 272–287 | ML+1 copy | <same Extra Bits/Offsets as 256–271> | | |
| 288–303 | ML+2 copy | <same> | | |
| 304–319 | ML+3 copy | " | | |
| 320–335 | ML+4 copy | " | | |
| 336–351 | ML+5 copy | " | | |
| 352–367 | ML+6 copy | " | | |
| 368–383 | ML+7 ..+8 | 1+" (length +1 extra length bit) | | |
| 384–399 | ML+9 ..+12 | 2+<same>(length +2 extra length bits) | | |
| 400–415 | ML+13 ..+20 | 3+<same>(length +3 extra length bits) | | |
| 416–431 | ML+21 ..+37460 | n+<same>(n==2+ 6/9/12/15 bits): 00+<6 bits>=ML +21 .. ML +84 01+<9 bits>=ML +85 .. ML +596 10+<12 bits>=ML +597 .. ML +4694 11+<15 bits>=ML +4695 .. ML +37460 | | |

In the preferred tokenizing scheme, several other considerations are involved. First, tokens greater than 255 are copy strings (or copy elements). Tokens 255 or below map directly to the literal pixel value that the tokens represent. Second, copy elements may be grouped into blocks of 16, with token bits 7 through 4 determining the block. Within each block, the pixel offset meaning is identical; the lower 4 token bits define the offset and/or how many extra bits follow the token to further define the offset. Third, token bits 7 through 4 for each copy block determine the copy string length and/or how many extra bits follow the token to further define the length. Fourth, extra length bits (if any) precede extra offset bits (if any). Fifth, for tokens 416–431 (which represent copy tokens having an extended length), two bits precede the extra length bits to indicate how many extra length bits follow.

Detailed Version of Method

Preprocessing of an Image

FIG. 4 illustrates a more detailed version of the entire compression/decompression process of the preferred embodiment of the present invention, applying the method illustrated in FIG. 2. Before compressing the image data, the colorspace of the image data optionally may be changed, in known fashion (Step 402). In the preferred embodiment, the color space in which to encode the image data is conventional YCrCb. If a source (or original) image is in a non-preferred colorspace (e.g., RGB), the image may first be converted to the preferred colorspace (i.e., YCrCb). (See International Radio Consultative Committee ("CCIR") Recommendation 601 .) However, such colorspace conversion is typically not lossless. Therefore, lossless conversion may only be done in cases where it is not critical for the decoded image to exactly match the source (or original) image.

The image being compressed optionally is subsampled to reduce the value range of the image data, in known fashion (Step 406). The degree of subsampling may vary by the color in the image. If subsampling (Step 406) is performed, each color in the image may first optionally have a filter applied to it, in known fashion, after changing the colorspace (Step 404). The preferred filter uses a three-element kernel of 1, 2, 1. For a two-dimensional image, this filter is applied along both dimensions of the image. Even if the colorspace is not changed (Step 402), the image may optionally be filtered (Step 404) before subsampling (Step 406).

In the preferred embodiment, the image data is prefiltered with one or more dynamically selected DPCM (differential pulse-code modulation) algorithms (Step 407). For continuous tone 24-bit images, such filtering will typically increase the number of matched strings and thereby reduce the compressed size of the image, because most pixels values are transformed into a set of small deltas. An inverse DPCM algorithm is applied when the data is decoded (Step 426), which adds no loss to the encode/decode process.

Preferably, the following three DPCM algorithms are used in the present invention, although different DPCMs may optionally be employed:

$$X=X-B; \qquad (1)$$

$$X=X-C; \text{ or} \qquad (2)$$

$$X=X-((B+C+1)/2), \qquad (3)$$

where B, C, and X are as follows:

| | | | | |
|---|---|---|---|---|
| row (n − 2) | . | . | . | . |
| row (n − 1) | . | B | . | . |
| row (n) | C | X | . | . |

X represents the target pixel, B is the prior pixel directly above X in the pixel array, and C is the prior pixel immediately preceding (or to the left of) X in the pixel array. In the preferred embodiment, for the first image column, DPCM algorithm (1) is always used, and for the first image row, DPCM algorithm (2) is always used. For the first pixel in the image, no DPCM is used in the preferred embodiment.

Searching and Tokenizing

Next, the image is compressed by traversing the image, pixel-by-pixel, in the predetermined non-linear traversing pattern, using the basic algorithm described in FIG. 2 and FIG. 3 (Step 408). Here, an attempt is made to match each target pixel to a prior pixel encountered in the predetermined non-linear traversing pattern. In addition, an attempt is made to extend each match to locate the longest string of prior pixels that match a current string of target pixels.

In the preferred embodiment, either palettized (8-bit) or 24-bit image data can be compressed. For 24-bit cases, the data may be compressed and separated per-component, i.e., as if the 24-bit data were three 8-bit images without palettes. Alternatively, for 24-bit cases, the data may be interleaved components, i.e., as if the image were a single component image with three times the number of columns.

As described above, the compressed data consists of a sequence of elements, each element either representing a literal pixel (e.g., transferred verbatim from the uncompressed source image) or a "copy" invocation. A copy invocation is a data pair [offset, length] that points back into the previously encoded image data to identify a string of matching prior pixels that is to be copied, upon decoding, to the current location of the data pair. For example, the pixel string may be as follows (assuming the digits below represent pixel values):

4321021032109879871111

Assuming lossless compression, the above pixel string might be encoded as the following list of elements (where "." indicates that a literal element follows and "[]" (i.e., [offset, length]) indicates that a copy element (or copy invocation) follows):

.4.3.2.1.0 [3,3] [7,4] .9.8.7 [3,3] .1 [1,4]

The above is an example of lossless compression, but it should be understood that the present invention can be used for lossy compression as well. As described above, in cases of lossy compression, for an image being compressed, the matching strings are allowed to be inexact but visually close matches. This "lossiness" does not affect the operation of the decoder, because the decoder has no concern that the encoder has matched strings in a lossy or lossless manner.

The literal and copy elements are re-mapped into a defined set of tokens, as described above. To achieve further compression, these tokens are histogrammed and Huffman coded in the preferred embodiment. The resulting codewords make up the majority of the output data stream. Extra non-Huffman'd bits may be placed between the Huffman codewords. These extra bits are interposed when the Huffman codeword is insufficient to carry all the information needed. For example, copy elements with very large copy lengths or copy elements with very large offsets will frequently require extra bits to follow the token to describe the high-order bits of the larger value. The existence of these extra bits is implied by the definition of the token that precedes the bits.

Huffman Encoding

Accordingly, after the image is tokenized (Step 408), the resulting data stream is preferably encoded using Huffman coding (Step 410). Preferably, the classical Huffman algorithm is used to create an optimal Huffman tree for the set of tokens. The Huffman tree is itself encoded in a compressed format at the beginning of the file containing the compressed image. Preferably, the output of this step is a compressed Huffman stream consisting of Huffman codewords of lengths 1–16 bits, optionally interspersed with additional codeword dependent data.

In the preferred embodiment, the Huffman tree is encoded in the following manner. The Huffman tree is represented by a vector of 432 integers corresponding positionally to all possible tokens, each holding a value from 0 to 16. These are termed "tokenlengths." The tokenlengths vector fully encodes the Huffman tree shape and indicates which tokens correspond to its leaves. The 0 to 16 tokenlengths values represent the token binary codeword length in bits. In codeword assignment, shorter codewords are assumed to be numerically less than the equivalent-length prefix of longer codewords (i.e., the longer codes tend to be prefixed with 1 bits, and the tree is deeper to the right):

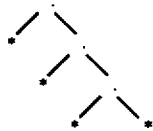

Sample tree shape: left branches (/) are codeword 0's, right branches (\) are codeword 1's, *'s represent token.

The tokenlengths vector is first reduced in size by removing any positions known to hold zeros, due to the encoding parameters for the image being processed. For instance, if the maximum offset (a user-tunable encoding parameter) is 65 or less, all token positions which represent offsets greater than 65 are removed, shrinking the vector.

Then, the tokenlengths vector is itself tokenized and bit-packed in the preferred embodiment. The following tokens are defined for use in compression of tokenlengths (in which the following text is interpreted as if the tokens were being decoded):

Repeat previous once ("R1"): output the previously decoded value once more.

Delta 1: add ±1 (using modulus-16 arithmetic to keep within range 1 to 16) to the previously decoded non-zero value, and output it once. Following the packed token is a single bit indicating the sign of the delta:
0: positive adjustment
1: negative adjustment Delta 2: identical to Delta 1, except with a value of 2.

Delta 3: identical to Delta 1, except with a value of 3.

Delta 4: identical to Delta 1, except with a value of 4.

Delta 5–8: Larger delta coding. Immediately following the delta token, 2 additional bits follow to indicate the magnitude of the delta. Following these 2 bits, a sign bit exists as with the smaller deltas. [NOTE: Delta +8 is illegal, and reserved. Since delta arithmetic is performed modulus-16, Delta +8 is equivalent to Delta −8. Delta −8 must be used in both cases.]

Repeat previous three times (a repeat-twice is coded via a pair of repeat-once's) ("R3") output the previously decoded value three times.

The repeat previous three times token ("repeat three token") takes on additional meaning it if is preceded by one or more repeat-once tokens. For every consecutive repeat-once that immediately precedes a repeat three token, an additional bit (up to a max of 8) follows the repeat-three token, indicating longer repeats as follows (with R1[n] representing n consecutive repeat-once tokens):

R1[1], R3: +1 bit, repeat 5–6
R1[2], R3: +2 bits, repeat 8–11
R1[3], R3: +3 bits, repeat 13–20
R1[4], R3: +4 bits, repeat 22–37
R1[5], R3: +5 bits, repeat 39–70
R1[6], R3: +6 bits, repeat 72–135
R1[7], R3: +7 bits, repeat 137–264
R1[8], R3: +8 bits, repeat 266–521

To illustrate, repeat-previous of all lengths are coded as set forth below [NOTES: (1) leading Rx's are assumed NOT to have a preceding R1, as there would be no reason for them to have such a value; (2) Rx, where x>3, are invocations of larger, composite repeats from a preceding row]:

1: R1[1]
2: R1[2]
3: R3
4: R3, R1[1] (note the R1[1] follows the R3)
5–6: R1[1], R3+1 bit
7: R6, R1[1]
8–11: R1[2], R3+2 bits
12: R11, R1[1]
13–20: R1[3], R3+3 bits
21: R20, R1[1]
22–37: R1[4], R3+4 bits
38: R37, R1[1]
39–70: R1[5], R3+5 bits
71: R70, R1[1]
72–135: R1[6], R3+6 bits
136: R135, R1[1]
137–264: R1[7], R3+7 bits
265: R264, R1[1]
266–521: R1[8], R3+8 bits Hard 0: Output a single 0 (indicating an unused token position). This does not change the "previously decoded value" field. (See the description below regarding the definition of the "previously decoded value.")

Multiple Hard 0's: Output 2 or more hard 0's. The count of hard 0's to output is determined by extension bits immediately following the token:

| Bits | Output Count (n[x] = x n's) |
|---|---|
| +0: | 2 (2) |
| +10n: | 3+n[1] (3–4) |
| +110nn: | 5+n[2] (5–8) |
| +1110nnn: | 9+n[3] (9–16) |
| +11110nnnn: | 17+n[4] (17–32) |
| +111110nnnnn: | 33+n[5] ((33–64) |
| +1111110nnnnnn: | 65+n[6] (65–128) |
| +11111110nnnnnnn: | 129+n[7] (129–256) |
| +111111111nnnnnnnn: | 257+n[8] (257–512) |

(Note that the longest allowed extension is 16 bits.)
Previously Decoded Value

This is a value reflecting the last non-zero value (1–16) that was output. (In other words, the "hard-0" token does not cause this field to be updated.) At startup, the field is defined to be 8. As encoding/decoding progresses, deltas are calculated and applied from/to it. The packed output bit-stream is formatted as follows:

| Bits: | |
|---|---|
| 0..N: | Packed delta code tokenlengths (see below) |
| n+1..: | Bit-stream of encoded tokenlengths |

Packed Delta Code Tokenlengths

The Huffman tree for the tokens used to model input tokenlengths must itself be described. This is done in bits 0–n of the stream. The following static Huffman code is used to encode the values from 0 to 8:

| 0:00 | 3:1010 | 6:1101 |
|---|---|---|
| 1:01 | 4:1011 | 7:1110 |
| 2:100 | 5:1100 | 8:1111 |

This value is then used to index a lookup table initialized as follows: (1, 2, 3, 4, 5, 6, 7, 8, 0). This represents the potential "dctokenlengths" (which are called dctokenlengths to distinguish from the main tokenlengths), along with a zero to designate unused codes. As encoding/decoding progresses, dctokenlengths that are no longer possible because their tree level has been fully committed are removed from the lookup table.

If trailing zero dctokenlengths exist, they are not stored. Rather, the decoder senses them automatically, because the Huffman tree will be exactly filled at the point the zeros begin. Also, the final dctokenlengths position is never stored; the decoder can always determine what it must be from examining the Huffman tree.

Blocking

With reference again to FIG. 4, the encoded image may optionally be segmented into blocks before storing or transmission of the compressed and encoded image (Step 412). In Step 412, a structure is imposed on the Huffman-encoded copy and literal tokens. This structure segments the token file into blocks (e.g., 16 blocks) of rows, allowing the decoder to display, or "paint", partial sections of the image as it arrives at the decoder. (See below for the preferred file format.)

Splash and Pre-Splash Images

A "splash" version of the image may optionally be prepended to the beginning of the data stream before transmitting or storing the compressed and encoded image (Step 414). The splash image is a greatly reduced (in size) version of the original image, which is reduced by decimation/filtering The splash image is encoded using the same compression scheme as the main image that follows the splash image in the data stream. When the splash image is received, it is decoded, scaled up, and painted into, for example, the screen display window. This provides the viewer of the image with an approximate rendering of the main image before that image arrives. The main image arrives after the splash image in segments (blocks of rows, as described above) and overlays the splash image.

The splash image preferably is not used in decoding the main image. This allows the splash image to be removed from the data file without affecting the ability to decode the main image. It should be recognized, however, that the splash image may be used in decoding the main image. Moreover, the splash image may be used to reduce the size of the main encoded image by using the information in the splash image, for example, by differential pulse-code modulating the main image data against the splash image before encoding the main image.

Optionally, a "presplash" code may also be employed. A presplash code represents the most "popular" or predominant color within the splash image. The presplash code can be used as a background color for the area where the splash image is to be displayed to frame the splash image.

In addition, for images that contain a palette (8-bit sources), another display option involves placing a "transparency" color in the file being transmitted or stored. When decoding, the calling application can specify a transparency replacement color. This color is placed in the palette atop the file transparency color, effectively "painting-in" the transparent areas with the replacement color.

Storage or Transmission

Whether the main compressed and encoded image is segmented (Step 412) and/or a splash image is prepended to the main image (Step 414), the main compressed and encoded image (i.e., the token set) is transmitted or stored (Step 416). The image may be transmitted from one computer system another, such as from system 10 to system 30 in FIG. 1, or the image may be stored in a memory device, such as the storage device 19 in FIG. 1. In either case, an advantage is obtained by compressing the image. If transmitted, the compressed image reaches its destination more quickly than if uncompressed and uses less bandwidth. If stored, the compressed image occupies less space in the memory device than the uncompressed image.

Decoding

When the transmitted compressed image is received, or the stored compressed image is retrieved, it is decoded (Step 418) by a decoder, preferably using a Huffman decoding algorithm that reverses the encoding process, in known fashion. The image is then decompressed (or expanded) to obtain a representation of the original image (Step 420), again in known fashion. (See, for example, the description of decompression given is U.S. Pat. No. 5,016,009, and in the references cited therein). Decompressing the image at this point restores the image as it was input into the compression stage at Step 408 of FIG. 4.

In conventional decompression, literal tokens are simply directly output as pixels, and prior decompressed pixel strings referenced by the offset and length information of copy tokens are copied to the output. However, interpolation may be used instead of copying. The preferred interpolation method involves simple linear interpolation in both dimensions, with each color component being interpolated independently of the others. For example, the interpolation times 3 between the two values, 0×10 and 0×40, would be, 0×10 [0×20] [0×30] 0×40, where the bracketed values are the values generated via interpolation. At the edge of the image, where no paired values exist between which to interpolate, the single value is replicated.

In decompression, tokens defining the compressed image are converted into pixel component values. Next, if the tokens are 24-bit, the tokens are interleaved with other color components to form output colors. If, on the other hand, the tokens are 8-bit, the image palette is indexed to form 24-bit output colors. Preferably, decoding (Step 418) and decompression (Step 420) are performed simultaneously, thereby simplifying the design, reducing memory requirements, and increasing time-efficiency. Decoding and decompression are logically distinct, however, and can therefore be implemented as independent steps performed at different times.

Optionally, the decoded and decompressed image may be filtered to enhance the image (Step 422). In the preferred embodiment, an enhancement filter is applied to the pixel component values resulting from the decompression step and is used before the decompressed rows and columns are scaled up to the output (or viewing) dimensions. Alternatively, the filter may be applied to the decompressed pixel component values. For instance, the filter can be enabled by value, e.g., to enhance only the Y-component or only the X-component. The preferred FIR filter is 7-tap, with coefficients of: 0.0625, −0.3125, 1.5, −0.3125, 0.0625. This is an approximated implementation of the filter disclosed in U.S. patent application Ser. No. 275,945, assigned to the assignee of the present invention, but altered to correspond to the modified filter used during decimation, and with a reduced number of coefficients. The alterations are made to reduce the cost of applying the filter, at a penalty of a slight reduction in the filter's accuracy.

If the original image was subsampled in Step 406, the decoded and expanded image is then reinterpolated, in known fashion (Step 424). The reinterpolation step preferably is a linear interpolation in both dimensions, as required. Each color component in a 24-bit encoding can be scaled individually. Thus, some components may be reinterpolated and others not, on an image-by-image basis.

Preferred File Format

The formatting of the compressed and encoded image file that is transmitted or stored will now be described in detail.

Format of the GT Art Data Stream

The preferred data format is known as the "GT art" format. This comprises a data stream that includes a header followed by a variable number of segments in the following format:

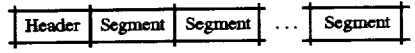

The Header Format is 8 bytes long in the preferred embodiment. The first two bytes (0 and 1) form a signature to identify the data as a GT art data stream. Bytes 2 and 3 identify the version of the stream. Typical decoders can decode a major version and a range of minor versions. Bytes 4, 5, 6 are reserved. Byte 7 identifies the encoder that created the stream. In summary, these bytes are:

Byte 0: 0×4A (ASCII "J")

Byte 1: 0×47 (ASCII "G")

Byte 2: Major Version

Byte 3: Minor Version

Byte 4: reserved

Byte 5: reserved

Byte 6: reserved

Byte 7: Encoder Version

Each Segment consists of a Prefix and Data section. The Prefix consists of Tag and Size fields, which are each encoded using one of three formats, depending on their values. The Data section is a string of arbitrary bytes, whose byte count is encoded in the Prefix as the Size field.

Prefix Format

The Segment Prefix is a sequence of one, two, or three bytes, which are used to encode the "segment type," called Tag, and a count called Size of the Data bytes that follow.

| Format | byte | Bit: | 7 | 6 | 5 | 4 | 3 | 2 | 1 | 0 |
|---|---|---|---|---|---|---|---|---|---|---|
| 1 byte | 0 | | 1 | 1 | [----------Tag----------] | | | | | |
| 2 byte | 0 | | 1 | 0 | [----------Size Low----------] | | | | | |
| | 1 | | [----Size Hi----] | | | [----------Tag----------] | | | | |
| 3 byte | 0 | | 0 | [----------Size Low----------] | | | | | | |
| | 1 | | [----------Size Hi----------] | | | | | | | |
| | 2 | | [----------Tag----------] | | | | | | | |

The 1-byte format allows a Tag value of 0–63 and 0 bytes of Data. The 2-byte format allows Tag values of 0–31 and 0–511 bytes of Data. The 3-byte format allows Tag values of 0–255 and 0–32767 bytes of Data. This encoder selects the shortest encoding for the values Tag and Size.

Data Section

The Data section contains data bytes of a format specific to the Tag identifier. The contents and preferred order of segments types are given below (with the value in hexadecimal of all tags and fields being beside the name):

Segment Type: JG_SEG_WINDOW_INFO (0×20)–Required (1)

Segment Type (1) defines the dimension of the output image and the colorspace and is formed by the following six bytes:

| byte | |
|---|---|
| 0 | Flags low btye |
| 1 | Flags high byte |
| 2 | Rows low byte |
| 3 | Rows high byte |
| 4 | Cols low byte |
| 5 | Cols high byte |

Each flag contains a single field identical in size, position, and meaning to JG_GTFLAG_CLR_xxx field in the GT_INSTANCE_INFO Segment. (See below.) This field determines the colorspace of the image. (See Segment Type JG_SEG_GTI_INFO described below.)

Segment Type: JG_SEG_TRANSPARENCY (0x1b)—Optional (2)

Segment Type (2) defines the transparent color of an image and is formed by the following four bytes:

| byte | | |
|---|---|---|
| 0 | 0x01 | |
| 1 | blue | value of transparent color (0–0xff) |
| 2 | green | value of transparent color (0–xff) |
| 3 | red | value of transparent color (0–0xff) |

Segment Type: JG_SEG_GTI_PALETTE (0x17)—Optional (3)

Segment Type (3) defines the preferred 3-color palette to use when displaying the image in a palettized mode. Palettized (8-bit) image instances may reference this palette as the Stream Palette. The three components (color 0-C0, color 1-C1, color 2-C2) are in order: Green (CO), then Blue (C1), then Red (C2).

The packed format of the palette is:

Byte
0 - Count of entries in palette minus 1 (0 to 255).
1 - Flag byte:
   Bit(s)

| 7–4: | Reserved, always 0 |
|---|---|
| 3: | 1=Colors may be quantized to less than 8 bits, and 2nd and 3rd colors may be compressed. (If 0, all raw elements are stored in 8-bit fields, and 2nd and 3rd are always stored all raw). |
| 2: | 1=Color 0 stored raw (always set if less than 8 entries present) |
| 1: | 1=Color 1 stored raw (always set if less than 8 entries present) |
| 0: | 1=Color 2 stored raw (always set if less than 8 entries present) |

Beyond the Start of the Bit Stream, data is stored on bit boundaries. Bits are ordered from high to low order in ascending address bytes. Fields are stored from high to low order bit.

If the "quantized/2nd-3rd compressed" flag bit (bit 3) is set, a 10-bit field (C0*81+C1*9+C2) follows, indicating the level (0–8) at which CO (Color 0), C1 (Color 1), and C2 (Color 2) were quantized. (For example, these 10-bit fields represent the number of bits per raw element).

If Color 0 is stored raw (always raw if 0/1 bit quantizing), contiguous n-bit (depending on Color 0 quantizing factor) fields are provided holding all Color 0 values. If, on the other hand, Color 0 is stored compressed (which only occurs with at least 8 values, although more than 8 values may still be stored raw), the first 16 bits are the delta mask, selecting which delta tokens are in use, as follows: The first bit is a 1 if a delta of 0 is coded; the 2nd bit is a 1 for a delta of 1; . . . ; the last (16th) bit is 1 if a delta of 15 is coded.

The meaning of the delta tokens is as follows. The delta tokens indicate the amount of change from the previous sample to the next. Delta values from 0 to 14 generate the next sample directly (via one token). A delta of 15 is a special case, indicating the delta is 15+ the following data. Many delta-15 tokens can appear in a row to code a large delta. There will always be a delta token of less than 15 to terminate one or more occurrences of delta-15.

The delta values are unsigned, meaning they can only move the current value in one direction. The preferred implementation starts out by sorting the palette via the first component in descending order. Thus, the delta tokens for the first color represent a negative change (i.e., are subtracted from the current first-color-value during decoding).

Following the 16 delta mask bits are the delta codeword length nibbles (each 4 bits). One nibble exists for every 1 bit in the delta mask. (That is, the codeword length nibbles and bits in the delta mask correspond positionally; thus the first nibble would represent the codeword length for delta-0, if it was used.) The Huffman length for the codeword is 1+the value stored in the nibble.

The next n bits hold the first color value in its raw form. Following the initial raw token are the variable length codewords for the delta tokens that define the remaining first color values.

If color 1 is stored raw (always raw if 0/1 bit quantizing), the following results: continuous n-bit (depending on Color 1 quantizing factor) fields are provided holding all Color 1 values. Otherwise Color 1 is stored compressed, which always occurs with at least 8 values. If compressed, the compressed representation is identical to Color 0, except for the definition of the delta-15 code, which is redefined to flag an escape-to-raw definition, indicating that the next n-bits (depending on the color's quantizing value) hold the color value as a raw value.

If Color 2 is stored raw (always raw if 0/1 bit quantizing), the following results: contiguous n-bit (depending on Color 2 quantizing factor) fields are provided holding all Color 2 values. Otherwise, Color 2 is stored compressed, which is always the case with at least 8 values, and the compressed representation is identical to Color 1.

Segment Type: JG_SEG_PRE_SPLASH (0x1c)—Optional (4)

Segment Type (4) is used to flood an image window with a color prior to painting or paneling in splash or image data. The Segment has the following four bytes:

| byte | | |
|---|---|---|
| 0 | 0x01 | |
| 1 | blue | value of PreSplash color |
| 2 | green | value of PreSplash color |
| 3 | red | value of PreSplash color |

An optional Splash instance may be placed here. If so, it would be composed of the segments JG_SEG_GTI_INFO through JG_SEG_GTI_DATA, exactly as would the main image instance (which follows in the data stream).

Segment Type: JG_SEG_GTI_INFO (0x16)—Required (5)

Segment Type (5) is required for each color component. If an image is 24-bit (3 component), three consecutive JG_SEG_GTI_INFO segments are required before any other segment. The format counts consecutive JG_SEG_GTI_INFO segments to determine the number of components in an image. The components are numbered 0, 1, 2 (as they appear in order).

The below C-language structure lays out the packed format of a GT Info Segment (UINT8 being an 'unsigned char' type):

```
TYPEDEF STRUCT {
    UINT8   Flags[2];         // various flags
    UINT8   ActualRows[2];    // actual rows of image data
    UINT8   ActualCols[2];    // actual cols of image data
    UINT8   CxWeights[2];     // color 0-2 4-bit weights; or DPCM type
    UINT8   MaxMinLen[1];     // max and minimum string length
    UINT8   MaxOffsets[2];    // len 2 and other max copy offsets
    UINT8   DifTol[2];        // different tolerance
} JG_PACKED_GT_INSTANCE_INFO;
```

All multi-byte fields are described below as single entities and are stored in the stream low byte to high byte.

The following eight flags correspond to the JG_PACKED_GT_INSTANCE_INFO Segment (i.e., Segment Type (5)):

FLAG (1): #define JG_GTFLAG_ROWS32 0x8000

Flag (1) is set if the maximum number of image rows packed per segment is 32. If Flag (1) is not set, the maximum number of rows stored per segment is 16.

FLAG (2): #define JG_GTFLAG_SPLASHONLY 0x4000

Flag (2) is set to indicate the image instance is a splash.

FLAG (3): #define JG_GTFLAG_PXF_MASK (0xf<<8) // pixel format mask

Flag (3) is a 4-bit field that determines the pixel format of the instance. It may take any of the following six values:

VALUE (1): #define JG_GTFLAG_PXF_NORMAL (0<<8) // shared palette index

An 8-bit palettized instance. The indexes encoded in the instance refer to the variable (encoder-defined) stream palette.

VALUE (2): #define JG_GTFLAG_PXF_RGB332 (1<<8) // 332 RGB indexes

An 8-bit instance. The indexes encoded in the instance refer to a preset 256-entry palette, where 3 bits are allocated for red, 3 bits for green, and 2 bits for blue.

VALUE (3): #define JG_GTFLAG_PXF_MONO (2<<8) // monochrome 8-bit

An 8-bit instance. The indexes encoded in the instance refer to a preset linear monochrome (gray-scale) palette, with 0 indicating black and 0xff indicating white.

VALUE (4): #define JG_GTFLAG_PXF_LOCAL (3<<8) // local palette indexes

An 8-bit instance. The indexes encoded in the instance refer to a variable (encoder-defined) palette, which will immediately follow the Info Segment.

VALUE (5): #define JG_GTFLAG_PXF_SEP24 (4<<8) // 24-bit separated A 24-bit instance. Three adjacent info segments must be present. Compressed image data consists of color component values, instead of indexes to a palette.

VALUE (6): #define JG_GTFLAG_PXF_INT24 (5<<8) // 24-bit interleaved A 24-bit instance. In this case, only a single Info Segment and set of encoded data is present. The three color components are left interleaved together (in B, G, R order) and encoded as if they were a single image with three times the number of columns.

FLAG (4): #define JG_GTFLAG_CLR_MASK (0xf<<4) // colorspace mask

Flag (4) is a 4-bit field that determines the colorspace of the instance (either the compressed data itself, if 24-bit, or the palette of an 8-bit palettized instance). It may take either of the following two values:

VALUE (1): #define JG_GTFLAG_CLR_BGR (0<<4) // BGR

The colorspace is RGB (the use of BGR in the name having no meaning).

VALUE (2): #define JG_GTFLAG_CLR_YUV (1<<4) // YUV The colorspace is YUV.

FLAG (5): #define JG_GTFLAG_ENHCOL 0x0008
FLAG (6): #define JG_GTFLAG_ENHROW 0x0004

When scaling the decompressed data up to its final dimension (if needed), Flags (5) and (6) control whether or not the enhancement filter (described above) is engaged. The enhancement is individually controllable for rows and columns.

FLAG (7): #define JG_GTFLAG_REPCOL 0x0002
FLAG (8): #define JG_GTFLAG_REPROW 0x0001

If set, Flags (7) and (8) cause the scaled image to be increased in size by replication of the entire image an appropriate number of times. If the image is decreasing in size, its bottom rows and right columns are clipped instead of scaling the entire range.

The following eight fields are used in conjunction with Segment Type (5) (i.e., the JG_SEG_GTI_INFO Segment):

FIELDS (1) and (2): JG PACKED GT INSTANCE INFO-.ActualRows and .ActualCols:

Fields (1) and (2) hold the number of rows and columns of compressed image data. If these values differ from those recorded in the JG_SEG_WINDOW_INFO segment, the image will be scaled to the JG_SEG_WINDOW_INFO segment dimensions.

FIELD (3): JG_PACKED_GT_INSTANCE_INFO.CxWeights:

If an 8-bit instance, Field (3) holds the color weights that are applied during the encoding process to the color component differences, as follows:

RedWeight*1024+GreenWeight*32+BlueWeight*1

These values are stored only for information purposes (and do not affect the decoding of the stream).

If a 24-bit instance, Field (3) holds the DPCM algorithm that was used during encoding, and that will need to be inverted during decode:

| | | |
|---|---|---|
| #define JG_DPCM_NONE | 0 | // none (DPCM not used) |
| #define JG_DPCM_AUTO | 1 | // auto (row-by-row selection) |
| #define JG_DPCM_BB2 | 2 | // X − (B + B)/2  (X − B) |
| #define JG_DPCM_CC2 | 3 | // X − (C + C)/2  (X − C) |
| #define JG_DPCM_BC2 | 4 | // X − (B + C)/2 |

The above assumes the following pixel relationships:

|       |   |
|-------|---|
| . . B |   |
| . C X | (where X is the target pixel) |

If "auto" is chosen, the DPCM algorithm is dynamically chosen on a per-row basis, and the algorithm type is recorded at the beginning of each compressed row. (See the above discussion of DPCM algorithms.)

FIELDS (4) and (5): JG_PACKED_GT_INSTANCE_INFO.MaxMinLen:

Fields (4) and (5) represent the minimum and maximum length copy strings, as programmed at encoding time. Both fields are 4-bits. The maximum length is stored in the high order four bits. The four bit code indexes the following vector to produce the actual minimum length: 0, 1, 2, 3, 4, 5, 6, 7, 9, 13, 21, 37, 69, 133, 261, 517, 1029. The four bit code indexes the following vector to produce the actual maximum length: 0, 1, 2, 3, 4, 5, 6, 8, 12, 20, 37460, 37460, 37460, 37460, 37460, 37460. After indexing the maximum length table, the minimum copy length is added to the result to create the final maximum copy length.

FIELDS (6) and (7): JG_PACKED_GT_INSTANCE_INFO.MaxOffsets:

Fields (6) and (7) are the maximum offset sizes for length 2 and length greater than 2 copies, set at encoding time. Both fields are 4-bits. The length 2 search size is stored in the high order bits. These fields control the maximum allowed offset a copy string may take (for length 2 copies and all copies greater than length 2). The four bit code indexes the following vector to produce the actual length 2 copy max offset size: 1, 2, 3, 4, 5, 9, 17, 33, 65, 129, 257, 513, 1025, 2049, 4097, 8193. The four bit code indexes the following vector to produce the actual length greater than 2 copy max offset size: 1, 2, 3, 4, 5, 9, 17, 33, 65, 129, 257, 513, 1025, 2049, 4097, 8193.

FIELD (8): JG_PACKED_GT_INSTANCE_INFO.DifTol:

Field (8) is the tolerance applied to the numeric difference between pixels at encode time to determine whether or not they are close enough to be considered equal. A "DifTol" of zero allows no pixels to be considered equal, inhibiting any matches from occurring. For 24-bit encodings, this field is simply compared to the absolute value of the difference between pixel values. For palettized (8-bit) encodings, the pixels to be compared are first de-palettized (indexes are looked-up in the palette). Then, the color vectors are differenced (subtracted from one another), the absolute values are taken, weighted as per CxWeights. Then, the result vector elements are squared and summed. This value is compared against "DifTol" to determine equality.

Segment Type: JG_SEG_GTI_PALETTE (0×17)–Optional (6)

Segment Type (6) represents the local or de-palettizing palette. This Segment is optional and is only used with 8 bit palettized image. It is stored in the same format as the stream palette. (See Segment Type JG_SEG_GTI_PALETTE.)

Segment Type: JG_SEG_GTI_HUFFMAN (0×18)–Optional (7)

The Huffman Segments are optional. If a Huffman Segment (Type (7)) is not received for a component, the data must be raw (stored without compression). If decoding a multiple color component (24-bit) image, the JG_SEG_GTI_HUFFMAN Segments must be ordered corresponding to the color components 0, 1, 2. The first 1–3 bytes of the Huffman Segment define the "most popular" mask. (See above.) The count of stored bytes is determined by the number of bytes required to output 5 one bits. If less than 3 bytes are required, the trailing 1 or 2 bytes are assumed to be zero. The three bytes logically stored represent a 24-bit mask. The positions of the five one-bits indicate which of the first 24 traversing pattern offsets are to be moved to the front and therefore coded most efficiently. The remaining offsets retain their relative order and are moved behind the five most popular offsets. (The concept of the five most popular offsets is described above.) A sample, "do nothing" mask would be the following single byte: 0×F8. This leaves the first 5 offsets the most popular. Alternatively:

0×0 0×0 0×1F would make the last 5 of the first 24 offsets the most popular.

Segment Type: JG_SEG_GTI_DATA (0×19)–Required (8)

For single component images, JG_SEG_GTI_DATA Segments (Type (8)) are ordered as sequential blocks of rows, starting from the top of the image, and may contain an arbitrary number (up to the maximum specified within the JG_SEG_WINDOW_INFO Segment (i.e., Segment Type (1))) of image rows. Sufficient Data segments exist to store all image rows. If the image has multiple components, JG_SEG_GTI_DATA Segments (i.e., Segment Type (8)) for each component are interleaved such that a new data segment for each component is available as the decoding process requires it. This relieves the decoder from having to cache component data segments. In the simple case, where all components are stored with the same subsampling factor, and the same number of rows are stored in each segment, the component segments are interleaved 0, 1, 2, 0, 1, 2, . . . If the last two components were subsampled at half the rate of the first component (typical for YUV instances), the ordering of the components would be 0, 0, 1, 2, 0, 0, 1, 2, . . . This is because there is twice as much component 0 data as component 1 and 2 data.

The first byte of a GT image data segment holds:

bit 7: 1 if segment data is stored uncompressed bits 6–5: reserved, must be 0 bits 4–0: count of component rows stored in segment–1

Following the first (count) byte, a bit stream begins. Data is stored on bit boundaries. Bits are ordered from high to low order in ascending address bytes. Fields are stored from high to low order bit.

The compressed bits for each data row are stored contiguously (with no byte boundaries between rows). The bits represent the GT tokens, as described above, converted to codewords using the Huffman tree for that component.

Additionally, if a variable (auto) DPCM mode is used, a 1 or 2 bit DPCM-type codeword is stored at the beginning of each row, as follows:

0-DPCM type JG_DPCM_BC2 (see earlier DPCM discussion)

10-DPCM type JG_DPCM_BB2

11-DPCM type JG_DPCM_CC2

This indicates the type of DPCM algorithm that was employed during the encoding of the following row.

Segment Type (9): JG_SEG_MINIATURE (0×7), segment length 0 (9)

Segment Type (9) indicates at what point in the stream enough data has been received to produce an acceptable "miniature" form of the image. The flag may be placed following the splash image, if the splash image is deemed acceptable for use to create a miniature, or the flag may be placed after the main image.

Segment Type (10): JG_SEG_EOF (0xb), segment length 0—Required (10)

Segment Type (10) indicates the end of the formatted stream.

The preceding Segments, Flags, and Values define the format for transmitting image data compressed and encoded in accordance with the present invention. Of course, those skilled in the art will recognize that the preceding format may be modified or that alternative formats may be employed. For example, as noted above, some of the Segments are optional and thus need not be used. Similarly, the "required" Segments may be modified, or replaced, if a substitute is provided. As another example, if an alternative form of encoding other than Huffman encoding is employed, the Huffman Segment can Conclusion By employing the predetermined non-linear traversing pattern, the present invention overcomes disadvantages and drawbacks of prior art compression methods. Compression speed is substantially increased, and the present invention eliminates the need for complex circuitry and time-consuming computations required in prior art hashing methods.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A method for compressing an original image, the original image having a pixel array, the pixel array having target pixels and prior pixels, each prior pixel being located in a position within the pixel array prior to each target pixel, the method comprising the steps of:

(a) compressing the original image to obtain a compressed image, including repeatedly:
      (1) traversing the pixel array according to a predetermined non-linear traversing pattern to locate a prior pixel, if any, matching a target pixel;
      (2) if such a matching prior pixel is located, then comparing corresponding target pixels and prior pixels linearly following the matched target pixel and prior pixel to locate a matching prior pixel string, if any;
      (3) repeating steps (1) and (2) to locate a longest matching prior pixel string;
      (4) generating a copy token as a compressed representation of each such longest matching prior pixel string; and
      (5) generating a literal token for each target pixel having no matching prior pixel.

2. A method for compressing an original image to obtain a compressed image, the original image having a pixel array, the pixel array having target pixels and prior pixels, each prior pixel being located in a position within the pixel array prior to each target pixel, the method comprising the steps of:

(a) repeatedly traversing the pixel array according to a predetermined non-linear traversing pattern to locate a longest matching prior pixel string, if any, matching a target pixel string;

(b) generating a copy token referencing such longest matching prior pixel string as a compressed representation of such matching target pixel string; and (c) generating a literal token for each target pixel having no matching prior pixel.

3. The method of claims 1 or 2, further including the step of further compressing the compressed image by encoding the compressed image using a Huffman encoding algorithm.

4. The method of claim 3 wherein all possible copy tokens and all possible literal tokens form a token set, the method further comprising the steps of:

(a) generating a Huffman tree for the token set;
   (b) outputting the Huffman tree; and
   (c) outputting the compressed image after outputting the Huffman tree.

5. The method of claim 4, further comprising the steps of:

(a) before outputting the Huffman tree, encoding the Huffman tree in a compressed format to obtain a compressed Huffman tree;
   (b) decoding the encoded compressed image using the Huffman tree; and
   (c) decompressing the decoded compressed image to obtain the original image.

6. The method of claim 1, further comprising the step of:

(a) subsampling the original image before compressing the original image.

7. The method of claim 1 wherein the predetermined non-linear traversing pattern has a fixed length.

8. The method of claim 6 wherein the predetermined non-linear traversing pattern is empirically determined.

9. The method of claim 8 wherein the predetermined non-linear traversing pattern has a plurality of pixel offsets, the first 24 of the plurality of pixel offsets being as follows:

| 23 | 18 | 16 | 7 | 17 | 19 | 24 |
| 21 | 14 | 6  | 3 | 9  | 15 | 22 |
| 11 | 8  | 4  | 1 | 5  | 10 | 20 |
| 12 | 13 | 2  | # |    |    |    | where "#" designates a pixel position being encoded and the numbers 1 through 24 designate the first 24 pixel offsets, in order.

10. The method of claims 1 or 2, wherein each longest matching data string has a string of matching pixels corresponding to a string of target pixels, and wherein, in locating the longest matching data strings, each pixel in the pixel array has a tolerance, whereby the string of matching pixels in a longest matching data string are considered to match a string of target pixels if each of the matching pixels in the string of matching pixels falls within the tolerance of the corresponding target pixel in the string of target pixels.

11. A system for compressing an original image to obtain a compressed image, the original image having a pixel array, the pixel array having target pixels and prior pixels, each prior pixel being located in a position within the pixel array prior to each of the target pixels, the system comprising:

(a) means for repeatedly traversing the pixel array according to a predetermined non-linear traversing pattern to locate a longest matching prior pixel string, if any, matching a target pixel string;
   (b) means for generating a copy token referencing such longest matching prior pixel string as a compressed representation of such matching target pixel string; and
   (c) means for generating a literal token for each target pixel having no matching prior pixel.

12. A computer program for compressing an original image to obtain a compressed image, the original image having a pixel array, the computer program being tangibly stored on a media readable by a computer system, the computer program being adapted for configuring the computer system upon being read and executed by the computer system to perform the functions of:
 (a) repeatedly traversing the pixel array according to a predetermined non-linear traversing pattern to locate a longest matching prior pixel string, if any, matching a target pixel string;
 (b) generating a copy token referencing such longest matching prior pixel string as a compressed representation of such matching target pixel string; and
 (c) generating a literal token for each target pixel having no matching prior pixel.

13. A method for compressing image data, the image data comprising an array of pixels, the array of pixels having an initial target pixel and prior pixels, each prior pixel being located before the initial target pixel within the array of pixels, the method comprising the steps of:
 (a) traversing the image data according to a reverse non-linear traversing pattern in a reverse direction within the array of pixels;
 (b) locating an initial matching prior pixel, if any, that matches the initial target pixel;
 (c) if an initial matching prior pixel is located, traversing, according to a linear traversing pattern in a forward direction within the array of pixels, both the pixels succeeding the initial target pixel and the pixels succeeding the initial matching prior pixel until a target pixel succeeding the initial target pixel does not match a prior pixel succeeding the initial matching prior pixel, thereby defining a matching data string;
 (d) continuing traversing the image data in the non-linear traversing pattern and attempting to locate another prior pixel that matches the initial target pixel;
 (e) if another matching prior pixel is located, defining another matching data string in accordance with step (c);
 (f) repeating steps (d) and (e) to define all matching data strings;
 (g) determining which of the matching data strings is a longest matching data string;
 (h) encoding the longest matching data string as a copy token.

14. A method for compressing image data, the image data comprising an array of pixels, including target pixels and prior pixels, each prior pixel being located in a position within the array of pixels prior to the target pixels, the method comprising the steps of:
 (a) traversing the prior pixels according to a predetermined non-linear traversing pattern having a beginning and an end, the beginning occurring at a first prior pixel having a predetermined location with respect to an initial target pixel, the end occurring at a final prior pixel having another predetermined location with respect to the initial target pixel;
 (b) locating an initial matching prior pixel, if any, from among the prior pixels being traversed according to the non-linear predetermined traversing pattern, the initial matching prior pixel matching the initial target pixel;
 (c) if an initial matching prior pixel is located, traversing, according to a linear traverse path, both the target pixels succeeding the initial target pixel and the prior pixels succeeding the initial matching prior pixel, each succeeding target pixel having a corresponding succeeding prior pixel along the linear traverse path;
 (d) comparing each succeeding target pixel to the corresponding succeeding prior pixel and continuing traversing in the linear traverse path until a succeeding target pixel is located that does not match the corresponding succeeding prior pixel, thereby locating a non-matching prior pixel;
 (e) defining a matching data string as a string of pixels beginning with the initial matching prior pixel and ending with the prior pixel immediately preceding the non-matching prior pixel in the array of pixels;
 (f) continuing traversing the prior pixels in the non-linear traversing pattern, beginning with a prior pixel preceding the initial matching prior pixel within the non-linear traversing pattern, and attempting to locate another prior pixel that matches the initial target pixel;
 (g) if another matching prior pixel is located, repeating steps (c) through (e) to define another matching data string;
 (h) repeating steps (f) and (g) until reaching the final prior pixel;
 (i) if only one matching data string is defined, characterizing the one matching data string as a longest matching data string;
 (j) if a plurality of matching data strings are defined, determining which of the plurality of matching data strings is the longest matching data string; and
 (k) encoding the longest matching data string as a copy token.

15. A method for compressing a stream of image data in a data compression system into a stream of encoded image data and for decompressing the stream of encoded image data into a decompressed image, the stream of image data comprising an array of pixels, the data compression system including a pixel pointer for indicating a target pixel being scanned, the method comprising the steps of:
 (a) scanning at least one of the pixels in array of pixels to obtain prior scanned pixels, each prior scanned pixel having a location within the array of pixels;
 (b) searching the prior scanned pixels for a matching data string that matches a string of pixels being scanned, including:
  (1) scanning an initial target pixel, the initial target pixel having a position in the array of pixels;
  (2) traversing the prior scanned pixels according to a predetermined non-linear traversing pattern;
  (3) determining whether any of the prior scanned pixels being traversed matches the initial target pixel being scanned, thereby locating an initial matching prior scanned pixel;
  (4) advancing the pixel pointer to a next target pixel to be scanned, the next target pixel being located at a position within the array of pixels immediately following the position of the initial target pixel;
  (5) determining whether the next target pixel matches a succeeding prior scanned pixel, the succeeding prior scanned pixel having a position in the array of pixels immediately following the initial matching prior scanned pixel;
  (6) advancing the pixel pointer and repeating step b(5) and thereby locating all succeeding prior scanned pixels that match the pixel indicated by the pixel pointer, until a matching prior scanned pixel is not found, thereby defining the matching data string;

(c) determining an offset representing a location, relative to the initial target pixel in the array of pixels, of the initial matching prior scanned pixel;

(d) determining a string length of the matching data string, the string length being the number of matching prior scanned pixels in the matching data string;

(e) converting the matching data string to a copy token, the copy token comprising the offset of the initial matching scanned pixel and the string length of the matching data string; and (f) encoding the copy token.

16. The method of claim 15, further comprising the step of:

(a) subsampling the array of pixels to reduce the data in the image data stream before searching the scanned prior pixels for the matching data string.

17. The method of claim 16 wherein each pixel includes color image data, the method further comprising the step of:

(a) filtering the color image data of each pixel before subsampling the array of pixels.

18. The method of claim 17 wherein the color image data has a colorspace, the method further comprising the step of:

(a) converting the colorspace of the image data to another colorspace before filtering the color image data.

19. The method of claim 18 wherein the colorspace is a YCrCb colorspace.

20. The method of claim 15 wherein each pixel in the array of pixels has a preset tolerance for use in determining when a matching scanned pixel has been located, such that, in determining whether a prior scanned pixel matches a target pixel, the following steps are performed:

(a) comparing a target pixel being scanned to a prior scanned pixel;

(b) determining whether the prior scanned pixel is within the preset tolerance of the target pixel; and (c) identifying the prior scanned pixel as a matching prior scanned pixel when the prior scanned pixel is within the preset tolerance of the target pixel.

21. The method of claim 15 wherein the predetermined non-linear traversing pattern has a fixed length for each individual stream of image data being compressed, the fixed length comprising an image traverse length; and wherein the image traverse length can vary from image to image.

22. The method of claim 15 wherein the predetermined non-linear traversing pattern has a length, the length being variable during compression of a single stream of image data being compressed.

23. The method of claim 15 wherein the predetermined non-linear traversing pattern comprises a fixed pattern for each individual stream of image data being compressed, the fixed pattern being variable from image to image.

24. The method of claim 15 wherein the predetermined non-linear traversing pattern is variable during compression of a single stream of image data being compressed.

25. The method of claim 15 wherein the array of pixels has an array limit; and wherein the predetermined non-linear traversing pattern has a plurality of segments, each of the plurality of segments corresponding to a scanned pixel, the method further comprising the step of:

(a) removing all segments from the plurality of segments that fall outside the array limit.

26. The method claim 25 wherein the predetermined non-linear traversing pattern is an empirically determined pattern, such that the empirically determined pattern causes the plurality of segments to be traversed in an empirically determined manner.

27. The method of claim 26 wherein the empirically determined pattern of the first 24 segments being traversed is as follows:

| 23 | 18 | 16 | 7 | 17 | 19 | 24 |
|----|----|----|---|----|----|----|
| 21 | 14 | 6  | 3 | 9  | 15 | 22 |
| 11 | 8  | 4  | 1 | 5  | 10 | 20 |
| 12 | 13 | 2  | # |    |    |    | where "#" is a target pixel being scanned and numbers 1–24 correspond to the first 24 segments being traversed, in order from 1 to 24.

28. The method of claim 27 wherein the empirically determined pattern of the next segments being traversed is as follows:

|    | 46 | 47 | 48 | 49 | 50 | 51 | 52 | 53 | 54 | 55 | 56 |
|----|----|----|----|----|----|----|----|----|----|----|----|
| 65 | 45 | 29 | 30 | 31 | 32 | 33 | 34 | 35 | 36 | 37 | 57 |
| 64 | 44 | 28 | .. | .. | .. | .. | .. | .. | .. | 38 | 58 |
| 63 | 43 | 27 | .. | .. | .. | .. | .. | .. | .. | 39 | 59 |
| 62 | 42 | 26 | .. | .. | .. | .. | .. | .. | .. | 40 | 60 |
| 61 | 41 | 25 | .. | .. | .. | #  |    |    |    |    |    | where the numbers 25–65 correspond to the next 41 segments being traversed, in order from 25–65.

29. The method of claim 26 wherein at least one of the plurality of segments in the predetermined non-linear traversing pattern is given a preferential status over the other segments in the traversing pattern, the copy token having a plurality of token positions; and wherein the at least one segment given the preferential status is assigned an optimal token position from among the plurality of token positions within the copy token.

30. The method of claim 15 wherein the stream of image data comprises a rectangular image.

31. The method of claim 15 wherein the matching data string is encoded according to a Huffman algorithm.

32. The method of claim 15 wherein the stream of encoded image data includes tokenized data, including literal tokens, each literal token corresponding to a pixel being scanned and having no matching prior scanned pixel, and including copy tokens, each copy token corresponding to a matching data string, if any, the method further comprising the steps of:

(a) converting each pixel being scanned having no matching prior scanned pixel into a literal token;

(b) converting each matching data string, if any, into a copy token;

(c) encoding each of the literal tokens and each of the copy tokens using a Huffman compression algorithm to obtain the stream of encoded image data;

(d) transmitting the stream of encoded image data; and (e) decoding the stream of encoded image data using a Huffman decompression algorithm to obtain a decoded stream of image data.

33. The method of claim 32, further comprising the step of:

(a) expanding the decoded stream of image data, including expanding each of the literal tokens and each of the copy tokens into pixel component values to obtain the decompressed image.

34. The method of claim 33 wherein the stream of encoded image data is decoded and expanded simultaneously.

35. The method of claim 33, further comprising the step of:

(a) filtering the pixel component values to enhance the decompressed image.

36. The method of claim 15 wherein the decompressed image is a two-dimensional image, the method further comprising the step of:
  (a) reinterpolating the decompressed image, including performing a linear interpolation in both dimensions of the two-dimensional image.

37. The method of claim 20 wherein the preset tolerance is variable.

38. The method of claim 20, further comprising the step of:
  (a) if the prior scanned pixel being compared is outside the preset tolerance of the target pixel being compared, continuing to perform the search of the array of pixels to determine whether another prior scanned pixel is within the preset tolerance of a pixel positioned immediately following the target pixel in the array of pixels.

39. The method of claim 33, further comprising the steps of:
  (a) subsampling the stream of image data to obtain a splash image;
  (b) encoding the splash image to obtain an encoded splash image;
  (c) transmitting the encoded splash image;
  (d) decoding the encoded splash image to obtain a decoded splash image; and
  (e) displaying the decoded splash image while the stream of encoded data is decoded and expanded.

40. The method of claim 39 wherein the splash image includes a plurality of colors, the method further comprising the steps of:
  (a) determining a pre-splash code representing a most common color from among the plurality of colors; and
  (b) displaying the most common color as a background color for the decoded splash image.

41. A method for compressing a stream of image data in a data compression system and for decompressing the stream of image data into a decompressed image, the stream of image data comprising an array of pixels, the array of pixels being capable of being subdivided into strings incorporating at least one of the pixels from the array of pixels, the method comprising the steps of:
  (a) scanning the array of pixels according to a predetermined non-linear traversing pattern to obtain prior scanned pixels;
  (b) comparing pixels being scanned to the prior scanned pixels to determine whether any pixels being scanned match any of the prior scanned pixels;
  (c) generating a matching data string for each string, if any, of at least one pixel being scanned that has a corresponding string of at least one prior scanned pixel that matches the pixel being scanned, each matching data string including image data corresponding to the matching prior scanned pixel;
  (d) if any matching data strings are generated, converting each such matching data string into a copy token;
  (e) if a pixel being scanned has no matching prior scanned pixel, converting the pixel being scanned into a literal token;
  (f) encoding the copy tokens, if any, and the literal tokens to obtain an encoded token set;
  (g) transmitting the encoded token set;
  (h) decoding the encoded token set to obtain a decoded token set; and
  (i) expanding the decoded token set to obtain the decompressed image.

42. The method of claim 41 wherein the comparing step further includes the steps of:
  (a) selecting an initial pixel being scanned;
  (b) traversing the prior scanned pixels according to the predetermined non-linear traversing pattern, such that the initial pixel being scanned is compared to individual prior scanned pixels according to the predetermined non-linear traversing pattern;
  (c) stopping traversing the prior scanned pixels in the predetermined non-linear traversing pattern if a first matching prior scanned pixel is located that matches the initial pixel;
  (d) selecting a next pixel to be scanned, the next pixel being located in a position immediately following the initial pixel in the array of pixels;
  (e) comparing the next pixel to a succeeding prior scanned pixel, the succeeding prior scanned pixel being located in a position immediately following the first matching prior scanned pixel in the array of pixels;
  (f) determining whether the succeeding prior scanned pixel matches the next pixel and thereby determining whether another matching prior scanned pixel exists; and
  (g) repeating selecting a next pixel to be scanned and comparing such next pixel to another succeeding prior scanned pixel, until a succeeding prior scanned pixel fails to match a next pixel.

43. The method of claim 41 wherein the step of converting the matching data string into a copy token further includes the steps of:
  (a) determining an offset representing a location of the first matching prior scanned pixel relative to the initial pixel within the array of pixels;
  (b) determining a string length representing the number of matching prior scanned pixels determined; and
  (c) coupling together the offset of the first matching prior scanned pixel and the string length to form the copy token.

44. The method of claim 41 wherein the copy tokens and literal tokens are encoded according to a Huffman algorithm.

45. The method of claim 41, further comprising the steps of:
  (a) generating a Huffman tree corresponding positionally to all possible copy tokens and literal tokens;
  (b) encoding the Huffman tree in a compressed format to obtain a compressed Huffman tree;
  (c) transmitting the compressed Huffman tree before transmitting the encoded token set;
  (d) decoding and expanding the compressed Huffman tree; and
  (e) using the Huffman tree to decode the encoded token set.

46. The method of claim 41, further comprising the steps of:
  (a) segmenting the encoded token set into a plurality of blocks, the plurality of blocks being decoded in succession upon being transmitted; and
  (b) displaying each of the plurality of blocks as they are decoded, such that portions of the decoded image, each portion corresponding to one of the plurality of blocks, can be displayed immediately after each such portion is decoded.

47. The method of claim 41, further comprising the steps of:
   (a) subsampling the stream of image data before scanning the array of pixels to reduce the data in the stream of image data; and
   (b) reinterpolating the decompressed image.

48. The method of claim 41 wherein each pixel being scanned has a tolerance; and wherein a prior scanned pixel matches a pixel being scanned if the prior scanned pixel falls within the tolerance of the pixel being scanned.

49. The method of claim 48, further comprising the step of:
   (a) providing a second tolerance indicating an average quality of matching scanned pixels.

50. A data compression system for compressing a stream of image data into a stream of encoded image data and for decompressing the stream of encoded image data into a decompressed image, the stream of image data comprising an array of pixels, the data compression system including a pixel pointer for indicating a target pixel being scanned, the system comprising:
   (a) a scanner for scanning at least one of the pixels in the array of pixels to obtain prior scanned pixels, each prior scanned pixel having a location within the array of pixels;
   (b) means for searching the prior scanned pixels for a matching data string that matches a string of pixels being scanned, including:
      (1) means for scanning an initial target pixel, the initial target pixel having a position in the array of pixels;
      (2) means for traversing the prior scanned pixels using a predetermined non-linear traversing pattern;
      (3) first comparing means for determining whether any of the prior scanned pixels matches the initial target pixel being scanned, thereby locating an initial matching prior scanned pixel;
      (4) means for advancing the pixel pointer to a next target pixel to be scanned, the next target pixel being located at a position within the array of pixels immediately following the position of the initial target pixel;
      (5) second comparing means for determining whether the next target pixel matches a succeeding prior scanned pixel, the succeeding prior scanned pixel having a position in the array of pixels immediately following the initial matching prior scanned pixel;
      (6) means for advancing the pixel pointer and repeating step b(5) and for thereby locating all succeeding prior scanned pixels that match the pixel indicated by the pixel pointer, until a matching prior scanned pixel is not found, thereby defining the matching data string;
   (c) means for determining an offset representing a location, relative to the initial target pixel in the array of pixels, of the initial matching prior scanned pixel;
   (d) means for determining a string length of the matching data string, the string length being the number of matching prior scanned pixels in the matching data string;
   (e) a converter for converting the matching data string to a copy token, the copy token comprising the offset of the initial matching prior scanned pixel and the string length of the matching data string; and
   (f) an encoder for encoding the copy token.

51. The system of claim 50, further comprising:
   (a) a sampling device for subsampling the array of pixels to reduce the data in the image data stream before operating the means for searching the prior scanned pixels.

52. The system of claim 51 wherein each pixel includes color image data, the system further comprising:
   (a) a filter for filtering the color image data of each pixel before the sampling device subsamples the array of pixels.

53. The system of claim 52 wherein the color image data has a colorspace, the system further comprising:
   (a) a converter for converting the colorspace of the image data to another colorspace before filtering the color image data.

54. The system of claim 53 wherein the colorspace is a YCrCb colorspace.

55. The system of claim 50 wherein each pixel in the array of pixels has a preset tolerance for use in determining when a matching prior scanned pixel has been located, the first and second comparing means each including:
   (a) a comparator for comparing a target pixel being scanned to a prior scanned pixel;
   (b) means for determining whether the prior scanned pixel is within the preset tolerance of the target pixel; and
   (c) means for identifying the prior scanned pixel as a matching prior scanned pixel when the prior scanned pixel is within the preset tolerance of the target pixel.

56. The system of claim 50 wherein the predetermined non-linear traversing pattern has a fixed length for each individual stream of image data being compressed, the fixed length comprising an image traverse length; and wherein the image traverse length can vary from image to image.

57. The system of claim 50 wherein the predetermined non-linear traversing pattern has a length, the length being variable during compression of a single stream of image data being compressed.

58. The system of claim 50 wherein the predetermined non-linear traversing pattern comprises a fixed pattern for each individual stream of image data being compressed, the fixed pattern being variable from image to image.

59. The system of claim 50 wherein the predetermined traversing pattern is variable during compression of a single stream of image data being compressed.

60. The system of claim 50 wherein the array of pixels has an array limit; and wherein the predetermined non-linear traversing pattern includes a plurality of segments, each of the plurality of segments corresponding to a prior scanned pixel, the system further comprising:
   (a) means for removing all segments from the plurality of segments that fall outside the array limit.

61. The system of claim 60 wherein the predetermined non-linear traversing pattern is an empirically determined pattern, such that the means for traversing the prior scanned pixels causes the plurality of segments to be traversed in an empirically determined manner.

62. The system of claim 61 wherein the empirically determined pattern of the first 24 segments being traversed is as follows:

| 23 | 18 | 16 | 7 | 17 | 19 | 24 |
| 21 | 14 | 6  | 3 | 9  | 15 | 22 |
| 11 | 8  | 4  | 1 | 5  | 10 | 20 |
| 12 | 13 | 2  | # |    |    |    | where "#" is a target pixel being scanned and numbers 1–24 correspond to the first 24 segments being traversed, in order from 1 to 24.

63. The system of claim 62 wherein the empirically determined pattern of the next 41 segments being traversed is as follows:

|    | 46 | 47 | 48 | 49 | 50 | 51 | 52 | 53 | 54 | 55 | 56 |
|----|----|----|----|----|----|----|----|----|----|----|----|
| 65 | 45 | 29 | 30 | 31 | 32 | 33 | 34 | 35 | 36 | 37 | 57 |
| 64 | 44 | 28 |    |    |    |    |    |    |    | 38 | 58 |
| 63 | 43 | 27 |    |    |    |    |    |    |    | 39 | 59 |
| 62 | 42 | 26 |    |    |    |    |    |    |    | 40 | 60 |
| 61 | 41 | 25 |    |    |    | #  |    |    |    |    |    | where the numbers 25–65 correspond to the next 41 segments being traversed, in order from 25–65.

64. The system of claim 61 wherein at least one of the plurality of segments in the empirically determined pattern has a preferential status over the other segments in the empirically determined pattern, the copy token having a plurality of token positions; and wherein the segment given the preferential status is assigned an optimal token position from among the plurality of token positions within the copy token.

65. The system of claim 50 wherein the stream of image data comprises a rectangular image.

66. The system of claim 50 wherein the matching data string is encoded according to a Huffman algorithm.

67. The system of claim 50 wherein the stream of encoded image data includes tokenized data, including literal tokens, each literal token corresponding to a pixel being scanned having no matching prior scanned pixel, and including copy tokens, each copy token corresponding to a matching data string, if any, the system further comprising:

(a) a converter for converting each pixel being scanned that has no matching prior scanned pixel into a literal token;

(b) a converter for converting each matching data string, if any, into a copy token;

(c) an encoder for encoding each of the literal tokens and each of the copy tokens using a Huffman compression algorithm to obtain the stream of encoded image data;

(d) a transmitter for transmitting the stream of encoded image data; and (e) a decoder for decoding the stream of encoded image data using a Huffman decompression algorithm to obtain a decoded stream of image data.

68. The system of claim 67, further comprising:

(a) means for expanding the decoded stream of image data, including means for expanding each of the literal tokens and each of the copy tokens into pixel component values to obtain the decompressed image.

69. The system of claim 68 wherein the stream of encoded image data is decoded and expanded simultaneously.

70. The system of claim 68, further comprising:

(a) a filter for filtering the pixel component values to enhance the decompressed image.

71. The system of claim 50 wherein the decompressed image is a two-dimensional image, the system further comprising:

(a) means for reinterpolating the decompressed image, including means for performing a linear interpolation in both dimensions of the two-dimensional image.

72. The system of claim 55 wherein the preset tolerance is variable.

73. The system of claim 55, further comprising:

(a) if the prior scanned pixel being compared by the comparator is outside the preset tolerance of the target pixel being compared by the comparator, means for continuing to perform the search of the array of pixels to determine whether another prior scanned pixel is within the preset tolerance of a pixel positioned immediately following the target pixel in the array of pixels.

74. The system of claim 68, further comprising:

(a) a sampler for subsampling the stream of image data to obtain a splash image;

(b) an encoder for encoding the splash image to obtain an encoded splash image;

(c) a transmitter for transmitting the encoded splash image;

(d) a decoder for decoding the encoded splash image to obtain a decoded splash image; and (e) a display for displaying the decoded splash image while the stream of encoded data is decoded and expanded.

75. The system of claim 74 wherein the splash image includes a plurality of colors, the system further comprising:

(a) means for determining a pre-splash code representing a most common color from among the plurality of colors; and (b) a display for displaying the most common color as a background color for the decoded splash image.

76. A system for compressing a stream of image data and for decompressing the stream of image data into a decompressed image, the stream of image data comprising an array of pixels, the array of pixels being capable of being subdivided into strings incorporating at least one of the pixels from the array of pixels, the system comprising:

(a) a scanner for scanning the array of pixels in a predetermined non-linear traversing pattern to obtain prior scanned pixels;

(b) a comparator for comparing pixels being scanned to the prior scanned pixels to determine whether any pixels being scanned match any of the prior scanned pixels;

(c) means for generating a matching data string, if any, for each string of at least one pixel being scanned that has a corresponding string of at least one prior scanned pixel that matches the pixel being scanned, each matching data string including image data corresponding to the matching prior scanned pixel;

(d) if any matching data strings are generated, a converter for converting each such matching data string into a copy token;

(e) if a pixel being scanned has no matching prior scanned pixel, a converter for converting the pixel being scanned into a literal token;

(f) an encoder for encoding the copy tokens, if any, and the literal tokens to obtain an encoded token set;

(g) a transmitter for transmitting the encoded token set;

(h) a decoder for decoding the encoded token set to obtain a decoded token set; and (i) means for expanding the decoded token set to obtain the decompressed image.

77. The system of claim 76 wherein the comparator further includes:

(a) means for selecting an initial pixel being scanned;

(b) means for traversing the prior scanned pixels according to the predetermined non-linear traversing pattern, such that the initial pixel being scanned is compared to individual prior scanned pixels according to the predetermined non-linear traversing pattern;

(c) means for stopping traversing the prior scanned pixels in the predetermined non-linear traversing pattern if a first matching prior scanned pixel is located that matches the initial pixel;

(d) means for selecting a next pixel to be scanned, the next pixel being located in a position immediately following the initial pixel in the array of pixels;

(e) means for comparing the next pixel to a succeeding prior scanned pixel, the succeeding prior scanned pixel being located in a position immediately following the first matching scanned pixel in the array of pixels;

(f) means for determining whether the succeeding prior scanned pixel matches the next pixel and thereby determining whether another matching prior scanned pixel exists; and (g) means for repeating selecting a next pixel to be scanned and comparing such next pixel to another succeeding prior scanned pixel, until such succeeding prior scanned pixel fails to match such next pixel.

78. The system of claim 76 wherein the converter for converting the matching data string into a copy token further includes:

(a) means for determining an offset representing a location of the first matching scanned pixel relative to the initial pixel within the array of pixels;

(b) means for determining a string length representing the number of matching scanned pixels determined; and (c) means for coupling together the offset of the first matching scanned pixel and the string length to form the copy token.

79. The system of claim 76 wherein the copy tokens and literal tokens are encoded according to a Huffman algorithm.

80. The system of claim 76, further comprising:

(a) means for generating a Huffman tree corresponding positionally to all possible copy tokens and literal tokens;

(b) an encoder for encoding the Huffman tree in a compressed format to obtain a compressed Huffman tree;

(c) a transmitter for transmitting the compressed Huffman tree before transmitting the encoded token set;

(d) a decoder for decoding and expanding the compressed Huffman tree; and (e) means for using the Huffman tree to decode the encoded token set.

81. The system of claim 76, further comprising:

(a) means for segmenting the encoded token set into a plurality of blocks, the plurality of blocks being decoded in succession upon being transmitted; and (b) a display unit for displaying each of the plurality of blocks as they are decoded, such that portions of the decoded image, each portion corresponding to one of the plurality of blocks, can be displayed immediately after each such portion is decoded.

82. The system of claim 76, further comprising:

(a) a sampler for subsampling the stream of image data before scanning the array of pixels to reduce the data in the stream of image data; and (b) means for reinterpolating the decompressed image.

83. The system of claim 76 wherein each pixel being scanned has a tolerance; and wherein a prior scanned pixel matches a pixel being scanned if the prior scanned pixel falls within the tolerance of the pixel being scanned.

84. The system of claim 83, further comprising:

(a) means for providing a second tolerance indicating an average quality of matching scanned pixels.

85. A computer program for compressing a stream of image data into a stream of encoded image data and for decompressing the stream of encoded image data into a decompressed image, the stream of image data comprising an array of pixels, the computer program being tangibly stored on a media readable by a computer system, the computer system including a pixel pointer for indicating a target pixel being scanned, the computer program being adapted for configuring the computer system upon being read and executed by the computer system to perform the functions of:

(a) scanning at least one of the pixels in the array of pixels to obtain prior scanned pixels, each prior scanned pixel having a location within the array of pixels;

(b) searching the prior scanned pixels for a matching data string that matches a string of pixels being scanned, including:

(1) scanning an initial target pixel, the initial target pixel having a position in the array of pixels;

(2) traversing the prior scanned pixels according to a predetermined non-linear traversing pattern;

(3) determining whether any of the prior scanned pixels being traversed matches the initial target pixel being scanned, thereby locating an initial matching prior scanned pixel;

(4) advancing the pixel pointer to a next target pixel to be scanned, the next target pixel being located at a position within the array of pixels immediately following the position of the initial target pixel;

(5) determining whether the next target pixel matches a succeeding prior scanned pixel, the succeeding prior scanned pixel having a position in the array of pixels immediately following the initial matching prior scanned pixel;

(6) advancing the pixel pointer and repeating function b(5) and thereby locating all succeeding prior scanned pixels that match the pixel indicated by the pixel pointer, until a matching prior scanned pixel is not found, thereby defining the matching data string;

(c) determining an offset representing a location, relative to the initial target pixel in the array of pixels, of the initial matching prior scanned pixel;

(d) determining a string length of the matching data string, the string length being the number of matching prior scanned pixels in the matching data string;

(e) convening the matching data string to a copy token, the copy token comprising the offset of the initial matching scanned pixel and the string length of the matching data string; and (f) encoding the copy token.

86. The computer program of claim 85, further performing the function of:

(a) subsampling the array of pixels to reduce the data in the image data stream before searching the prior scanned pixels for the matching data string.

87. The computer program of claim 85 wherein each pixel in the array of pixels has a preset tolerance for use in determining when a matching prior scanned pixel has been located, such that, in determining whether a prior scanned pixel matches a target pixel, the computer program performs the following further functions of:

(a) comparing a target pixel being scanned to a prior scanned pixel;

(b) determining whether the prior scanned pixel is within the preset tolerance of the target pixel; and (c) identifying the prior scanned pixel as a matching prior scanned pixel when the prior scanned pixel is within the preset tolerance of the target pixel.

88. The computer program of claim 85 wherein the predetermined non-linear traversing pattern has a fixed length for each individual stream of image data being compressed, the fixed length comprising an image traverse length; and wherein the image traverse length can vary from image to image.

89. The computer program of claim 85 wherein the array of pixels has an array limit; and wherein the predetermined non-linear traversing pattern has a plurality of segments, each of the plurality of segments corresponding to a prior scanned pixel, the computer program further performing the following function:

(a) removing all segments from the plurality of segments that fall outside the array limit.

90. The computer program of claim 85 wherein the matching data string is encoded according to a Huffman algorithm.

91. The computer program of claim 85, wherein the stream of encoded image data includes tokenized data, including literal tokens, each of the literal tokens corresponding to a pixel being scanned and having no matching prior scanned pixel, and including copy tokens, each copy token corresponding to a matching data string, if any, the computer program further performing the following functions:

(a) converting each pixel being scanned that has no matching prior scanned pixel into a literal token;

(b) converting each matching data string, if any, into a copy token;

(c) encoding each of the literal tokens and each of the copy tokens using a Huffman compression algorithm to obtain the stream of encoded image data;

(d) transmitting the stream of encoded image data; and (e) decoding the stream of encoded image data using a Huffman decompression algorithm to obtain a decoded stream of image data.

92. The computer program of claim 91, further performing the function of:

(a) expanding the decoded stream of image data, including expanding each of the literal tokens and each of the copy tokens into pixel component values to obtain the decompressed image.

93. The computer program of claim 92, wherein the stream of encoded image data is decoded and expanded simultaneously.

94. The computer program of claim 92, further performing the functions of:

(a) subsampling the stream of image data to obtain a splash image;

(b) encoding the splash image to obtain an encoded splash image;

(c) transmitting the encoded splash image;

(d) decoding the encoded splash image to obtain a decoded splash image; and (e) displaying the decoded splash image while the stream of encoded data is decoded and expanded.

95. A computer program for compressing a stream of image data and for decompressing the stream of image data into a decompressed image, the stream of image data comprising an array of pixels, the array of pixels being capable of being subdivided into strings incorporating at least one of the pixels from the array of pixels, the computer program being tangibly stored on a media readable by a computer system, the computer program being adapted for configuring the computer system upon being read and executed by the computer system to perform the functions of:

(a) scanning the array of pixels according to a predetermined non-linear traversing pattern to obtain prior scanned pixels;

(b) comparing pixels being scanned to the prior scanned pixels to determine whether any pixels being scanned match any of the prior scanned pixels;

(c) generating a matching data string for each string of at least one pixel being scanned that has a corresponding string of at least one prior scanned pixel that matches the pixel being scanned, each matching data string including image data corresponding to the matching prior scanned pixel;

(d) if any matching data strings are generated, converting each such matching data string into a copy token;

(e) if a pixel being scanned has no matching prior scanned pixel, converting the pixel being scanned into a literal token;

(f) encoding the copy tokens, if any, and the literal tokens to obtain an encoded token set;

(g) transmitting the encoded token set;

(h) decoding the encoded token set to obtain a decoded token set; and (i) expanding the decoded token set to obtain the decompressed image.

96. The computer program of claim 95 wherein the function of comparing pixels being scanned further includes the following functions:

(a) selecting an initial pixel being scanned;

(b) traversing the prior scanned pixels according to the predetermined non-linear traversing pattern, such that the initial pixel being scanned is compared to individual prior scanned pixels according to the predetermined non-linear traversing pattern;

(c) stopping traversing the prior scanned pixels in the predetermined non-linear traversing pattern if a first matching prior scanned pixel is located that matches the initial pixel;

(d) selecting a next pixel to be scanned, the next pixel being located in a position immediately following the initial pixel in the array of pixels;

(e) comparing the next pixel to a succeeding prior scanned pixel, the succeeding prior scanned pixel being located in a position immediately following the first matching prior scanned pixel in the array of pixels;

(f) determining whether the succeeding prior scanned pixel matches the next pixel and thereby determining whether another matching prior scanned pixel exists; and (g) repeating selecting a next pixel to be scanned and comparing such next pixel to another succeeding prior scanned pixel, until a succeeding prior scanned pixel fails to match a next pixel.

97. The computer program of claim 96 wherein the function of converting the matching data string into a copy token further includes the functions of:

(a) determining an offset representing a location of the first matching scanned pixel relative to the initial pixel within the array of pixels;

(b) determining a string length representing the number of matching prior scanned pixels determined; and (c) coupling together the offset of the first matching prior scanned pixel and the string length to form the copy token.

98. The computer program of claim 95, further performing the functions of:

(a) generating a Huffman tree corresponding positionally to all possible copy tokens and literal tokens;

(b) encoding the Huffman tree in a compressed format to obtain a compressed Huffman tree;

(c) transmitting the compressed Huffman tree before transmitting the encoded token set;

(d) decoding and expanding the compressed Huffman tree; and (e) using the Huffman tree to decode the encoded token set.

99. The computer program of claim 95, further performing the functions of:

(a) segmenting the encoded token set into a plurality of blocks, the plurality of blocks being decoded in succession upon being transmitted; and (b) displaying each of the plurality of blocks as they are decoded, such that portions of the decoded image, each portion corresponding to one of the plurality of blocks, can be displayed immediately after each such portion is decoded.

100. The computer program of claim 95, wherein each pixel being scanned has a tolerance; and wherein a prior scanned pixel matches a pixel being scanned if the prior scanned pixel falls within the tolerance of the pixel being scanned.

101. A method for compressing an incoming data stream, the incoming data stream comprising a plurality of incoming data segments, a group of two or more of the plurality of incoming data segments comprising an incoming data string, the method comprising the steps of:

(a) reading the incoming data stream to obtain prior data, the prior data including a plurality of prior data segments, a group of two or more of the plurality of prior data segments comprising a prior data string;

(b) searching the prior data in a predetermined non-linear traversing pattern for longest matching prior data strings, each longest matching prior data string comprising a prior data string and matching an incoming data string from the incoming data stream;

(c) if any longest matching prior data strings are found in the prior data, compressing the longest matching prior data strings to obtain compressed strings and encoding the compressed strings as copy tokens;

(d) for any incoming data segment having no matching prior data segment, encoding such incoming data segment as a literal token; and (e) outputting the copy tokens, if any, and the literal tokens.

102. The method of claim 101, wherein the incoming data stream comprises an image having a plurality of pixels; wherein the plurality of prior data segments comprise a plurality of prior pixels in the image and the plurality of incoming segments comprise a plurality of target pixels in the image; and wherein the predetermined non-linear traverse pattern is a variable pattern determined empirically based on the frequency of matches between prior pixels and a selected target pixel.

103. The method of claim 101, wherein the target pixels have a tolerance level; and wherein a string of prior pixels is considered to match a string of target pixels if the string of prior pixels falls within the tolerance level of the string of target pixels.

104. A system for compressing an incoming data stream, the incoming data stream comprising a plurality of incoming data segments, a group of two or more of the plurality of incoming data segments comprising an incoming data string, the system comprising:

(a) means for reading the incoming data stream to obtain prior data, the prior data including a plurality of prior data segments, a group of two or more of the plurality of prior data segments comprising a prior data string;

(b) means for searching the prior data in a predetermined non-linear traversing pattern for longest matching prior data strings, each longest matching prior data string comprising a prior data string and matching an incoming data string from the incoming data stream;

(c) if any longest matching prior data strings are found in the prior data, a compressor for compressing the longest matching prior data strings to obtain compressed strings and an encoder for encoding the compressed strings as copy tokens;

(d) for any incoming data segment having no matching prior data segment, an encoder for encoding such incoming data segment as a literal token; and (e) a port for outputting the copy tokens, if any, and the literal tokens.

105. A method for compressing data, the data including a plurality of data segments having an order, the plurality of data segments including target segments and prior segments, the prior segments preceding the target segments within the order of the plurality of data segments, the method comprising the steps of:

(a) selecting an initial target segment;

(b) traversing the prior segments according to a predetermined non-linear traversing pattern; and (c) locating a longest matching string of prior segments that matches a string of target segments, the string of target segments commencing at the initial target segment, the string of prior segments having an initial matching prior segment lying within the predetermined non-linear traversing pattern.

106. The method of claim 105, wherein the locating step includes the steps of:

(a) traversing the prior segments, commencing at the initial matching prior segment, in a first linear traverse path;

(b) traversing the target segments, commencing at the initial target segment, in a second linear traverse path, each target segment along the second linear traverse path having a corresponding prior segment along the first linear traverse path;

(c) comparing each target segment lying along the second linear traverse path to the corresponding prior segment lying along the first linear traverse path to determine whether each such target segment matches the corresponding prior segment; and (d) stopping traversing the prior segments and target segments if a target segment fails to match the corresponding prior segment, the number of matching prior segments commencing at the initial matching prior segment comprising a first matching string having a first matching string length.

107. The method of claim 106 wherein the locating step further includes the steps of:

(a) after the stopping step, continuing traversing in the predetermine non-linear traversing pattern the prior segment preceding the initial matching prior segment;

(b) locating a next matching prior segment, if any, within the non-linear traversing pattern, that matches the initial target segment;

(c) traversing the prior segments, commencing at the next matching prior segment, in a third linear traverse path;

(d) traversing the target segments, commencing at the initial target segment, in the second linear traverse path, each target segment along the second linear traverse path having a corresponding prior segment along the third linear traverse path;

(e) comparing each target segment lying along the second linear traverse path to the corresponding prior segment lying along the third linear traverse path to determine whether each such target segment matches the corresponding prior segment;

(f) stopping traversing the prior segments and target segments if a target segment fails to match the corresponding prior segment, the number of matching prior segments commencing at the next matching prior segment comprising a second matching string having a second matching string length;

(g) comparing the first matching string length of the first matching string to the second matching string length of the second matching string to determine which is longer; and (h) defining the matching string having the longer length as the longest matching string of prior segments.

108. The method of claim 105, wherein the step of locating a longest matching string includes applying a tolerance level to the prior segments to determine whether prior segments match target segments.

109. The method of claim 105, wherein the predetermined non-linear traversing pattern has a fixed length.

110. The method of claim 105, wherein the predetermined non-linear traversing pattern has a fixed pattern; and wherein the first 24 data segments traversed by the predetermined non-linear traversing pattern are as follows:

| 23 | 18 | 16 | 7 | 17 | 19 | 24 |
| 21 | 14 | 6  | 3 | 9  | 15 | 22 |
| 11 | 8  | 4  | 1 | 5  | 10 | 20 |
| 12 | 13 | 2  | # |    |    |    | where "#" represents the initial target segment and the numbers 1–24 represent the first 24 data segments traversed, in order from 1 to 24.

111. The method of claim 105, wherein the data comprises image data and the plurality of data segments comprise a plurality of pixels.

112. A system for compressing data, the data including a plurality of segments having an order, the plurality of segments including target segments and prior segments, the prior segments preceding the target segments within the order of the plurality of segments, the system comprising:

(a) means for selecting an initial target segment;

(b) means for traversing the prior segments according to a predetermined non-linear traversing pattern; and (c) means for locating a longest matching string of prior segments that matches a string of target segments, the string of target segments commencing at the initial target segment, the string of prior segments having an initial matching prior segment lying within the predetermined non-linear traversing pattern.

113. The system of claim 112, wherein the means for locating includes:

(a) means for traversing the prior segments, commencing at the initial matching prior segment, in a first linear traverse path;

(b) means for traversing the target segments, commencing at the initial target segment, in a second linear traverse path, each target segment along the second linear traverse path having a corresponding prior segment along the first linear traverse path;

(c) means for comparing each target segment lying along the second linear traverse path to the corresponding prior segment lying along the first linear traverse path to determine whether each such target segment matches the corresponding prior segment; and (d) means for stopping traversing the prior segments and target segments if a target segment fails to match the corresponding prior segment, the number of matching prior segments commencing at the initial matching prior segment comprising a first matching string having a first matching string length.

114. The system of claim 113, wherein the means for locating further includes:

(a) after operation of the stopping means, means for continuing traversing in the predetermined non-linear traversing pattern the prior segments preceding the initial matching prior segment;

(b) means for locating a next matching prior segment, if any, within the non-linear traversing pattern, that matches the initial target segment;

(c) means for traversing the prior segments, commencing at the next matching prior segment, in a third linear traverse path;

(d) means for traversing the target segments, commencing at the initial target segment, in the second linear traverse path, each target segment along the second linear traverse path having a corresponding prior segment along the third linear traverse path;

(e) means for comparing each target segment lying along the second linear traverse path to the corresponding prior segment lying along the third linear traverse path to determine whether each such target segment matches the corresponding prior segment;

(f) means for stopping traversing the prior segments and target segments if a target segment fails to match the corresponding prior segment, the number of matching prior segments commencing at the next matching prior segment comprising a second matching string having a second matching string length;

(g) means for comparing the first matching string length of the first matching string to the second matching string length of the second matching string to determine which is longer; and (h) means for defining the matching string having the longer length as the longest matching string of prior segments.

115. The system of claim 112 wherein the means for locating a longest matching string includes means for applying a tolerance level to the prior segments to determine whether prior segments match target segments.

116. The system of claim 112 wherein the predetermined non-linear traversing pattern has a fixed length.

117. The system of claim 112 wherein the predetermined non-linear traversing pattern has a fixed pattern, and wherein the first 24 data segments traversed by the predetermined non-linear traversing pattern are as follows:

| 23 | 18 | 16 | 7 | 17 | 19 | 24 |
| 21 | 14 | 6  | 3 | 9  | 15 | 22 |
| 11 | 8  | 4  | 1 | 5  | 10 | 20 |
| 12 | 13 | 2  | # |    |    |    | where "#" represents the initial target segment and the numbers 1–24 represent the first 24 data segments traversed, in order from 1 to 24.

118. The system of claim 112 wherein the data comprises image data and the plurality of data segments comprise a plurality of pixels.

119. A computer program for compressing data, the data including a plurality of segments having an order, the plurality of segments including target segments and prior segments, the prior segments preceding the target segments within the order of the plurality of segments, the computer program being tangibly stored on a media readable by a computer system, the computer program being adapted for configuring the computer system upon being read and executed by the computer system to perform the functions of:

(a) selecting an initial target segment;

(b) traversing the prior segments according to a predetermined non-linear traversing pattern; and (c) locating a longest matching string of prior segments that matches a string of target segments, the string of target segments commencing at the initial target segment, the string of prior segments having an initial matching prior segment lying within the predetermined non-linear traversing pattern.

120. The computer program of claim 119, wherein the locating function includes:

(a) traversing the prior segments, commencing at the initial matching prior segment, in a first linear traverse path;

(b) traversing the target segments, commencing at the initial target segment, in a second linear traverse path, each target segment along the second linear traverse path having a corresponding prior segment along the first linear traverse path;

(c) comparing each target segment lying along the second linear traverse path to the corresponding prior segment lying along the first linear traverse path to determine whether each such target segment matches the corresponding prior segment; and (d) stopping traversing the prior segments and target segments if a target segment fails to match the corresponding prior segment, the number of matching prior segments commencing at the initial matching prior segment comprising a first matching string having a first matching string length.

121. The computer program of claim 120, wherein the locating function further includes:

(a) after the stopping function, continuing traversing in the predetermined non-linear traversing pattern the prior segment preceding the initial matching prior segment;

(b) locating a next matching prior segment, if any, within the non-linear traversing pattern, that matches the initial target segment;

(c) traversing the prior segments, commencing at the next matching prior segment, in a third linear traverse path;

(d) traversing the target segments, commencing at the initial target segment, in the second linear traverse path, each target segment along the second linear traverse path having a corresponding prior segment along the third linear traverse path;

(e) comparing each target segment lying along the second linear traverse path to the corresponding prior segment lying along the third linear traverse path to determine whether each such target segment matches the corresponding prior segment;

(f) stopping traversing the prior segments and target segments if a target segment fails to match the corresponding prior segment, the number of matching prior segments commencing at the next matching prior segment comprising a second matching string having a second matching string length;

(g) comparing the first matching string length of the first matching string to the second matching string length of the second matching string to determine which is longer; and (h) defining the matching string having the longer length as the longest matching string of prior segments.

* * * * *